(12) United States Patent
Omori et al.

(10) Patent No.: US 7,737,066 B2
(45) Date of Patent: Jun. 15, 2010

(54) NIOBIUM MONOXIDE POWDER, NIOBIUM MONOXIDE SINTERED BODY AND CAPACITOR USING THE SINTERED BODY

(75) Inventors: Kazuhiro Omori, Kanagawa (JP); Kazumi Naito, Chiba (JP); Toshiya Kawasaki, Kanagawa (JP); Kouichi Wada, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 728 days.

(21) Appl. No.: 10/382,570

(22) Filed: Mar. 7, 2003

(65) Prior Publication Data

US 2003/0170169 A1 Sep. 11, 2003

Related U.S. Application Data

(63) Continuation-in-part of application No. 10/144,861, filed on May 15, 2002, now abandoned, and a continuation-in-part of application No. PCT/JP02/04646, filed on May 14, 2002.

(60) Provisional application No. 60/291,925, filed on May 21, 2001, provisional application No. 60/331,200, filed on Nov. 9, 2001.

(30) Foreign Application Priority Data

May 15, 2001 (JP) .............................. 2001-145571
Nov. 6, 2001 (JP) .............................. 2001-340318

(51) Int. Cl.
*C01G 33/00* (2006.01)
(52) U.S. Cl. .................. 501/134; 501/80; 501/81; 501/82; 501/83; 501/84; 501/85; 423/594.17; 264/681; 361/301.1; 361/321.1
(58) Field of Classification Search ............... 501/134, 501/80–85; 423/594.17; 264/681; 361/301.1; 361/321.1
See application file for complete search history.

(56) References Cited

U.S. PATENT DOCUMENTS

| | | | | |
|---|---|---|---|---|
| 4,379,852 A * | 4/1983 | Watanabe et al. | ............. | 501/87 |
| 4,671,858 A | 6/1987 | Kunugihara et al. | | |
| 6,136,062 A | 10/2000 | Loffelholz et al. | | |
| 6,165,623 A | 12/2000 | Fife et al. | | |
| 6,373,685 B1 * | 4/2002 | Kimmel et al. | ............. | 361/508 |
| 6,387,150 B1 * | 5/2002 | Naito | ........................... | 75/245 |
| 6,391,275 B1 * | 5/2002 | Fife | ........................ | 423/594.8 |
| 6,416,730 B1 * | 7/2002 | Fife | ........................ | 423/594.8 |
| 6,592,740 B2 * | 7/2003 | Fife | ........................... | 205/149 |
| 6,759,026 B2 * | 7/2004 | Kimmel et al. | ........... | 423/592.1 |

FOREIGN PATENT DOCUMENTS

| | | | |
|---|---|---|---|
| EP | 1093137 | * | 4/2001 |
| EP | 1 204 126 A1 | | 5/2002 |
| JP | 55-157226 A | | 12/1980 |
| JP | 3-159201 | * | 7/1991 |
| JP | 4-163825 | * | 6/1992 |
| JP | 10-242004 A | | 9/1998 |
| JP | 2000-119710 A | | 4/2000 |
| JP | 2000-188243 | | 7/2000 |
| KR | 9109012 | * | 10/1991 |
| WO | WO 00/15555 A | | 3/2000 |
| WO | 00/49633 | * | 8/2000 |
| WO | WO 01/06525 A1 | | 1/2001 |

OTHER PUBLICATIONS

International Search Report for PCT/JP02/04646 dated Aug. 20, 2002.
Government of India Patent Office, Feb. 27, 2008.

* cited by examiner

*Primary Examiner*—Steven Bos
(74) *Attorney, Agent, or Firm*—Sughrue Mion, PLLC

(57) ABSTRACT

(1) A niobium monoxide powder for a capacitor represented by formula: $NbO_x$ (x=0.8 to 1.2) and optionally containing other elements in an amount of 50 to 200,000 ppm, having a tapping density of 0.5 to 2.5 g/ml, an average particle size of 10 to 1000 μm, angle of repose from 10° to 60°, the BET specific surface area from 0.5 to 40 $m^2/g$ and a plurality of pore diameter peak tops in the pore distribution, and a producing method thereof; (2) a niobium monoxide sintered body, which is obtained by sintering the above niobium monoxide powder and, having a plurality of pore diameter peak tops in a range of 0.01 μm to 500 μm, preferably, the peak tops of two peaks among the plurality of pore diameter peak tops having a highest relative intensity are present in the range of 0.2 to 0.7 μm and in the range of 0.7 to 3 μm, respectively, and a producing method thereof; (3) a capacitor using the above sintered body and a producing method thereof; and (4) an electronic circuit and electronic device using the above capacitor.

11 Claims, No Drawings

NIOBIUM MONOXIDE POWDER, NIOBIUM MONOXIDE SINTERED BODY AND CAPACITOR USING THE SINTERED BODY

CROSS REFERENCE TO THE RELATED APPLICATIONS

This is a Continuation-in-Part of (i) application Ser. No. 10/144,861 filed May 15, 2002, now abandoned which claims benefit of Provisional Application No. 60/291,925 filed May 21, 2001, and Provisional Application No. 60/331,200 filed Nov. 9, 2001; and (ii) International Application No. PCT/JP02/04646 filed May 14, 2002, which claims benefit of Provisional Application No. 60/291,925 filed May 21, 2001, and Provisional Application No. 60/331,200 filed Nov. 9, 2001; the above noted prior applications are all hereby incorporated by reference.

TECHNICAL FIELD

The present invention relates to a niobium monoxide powder and a sintered body thereof, which can stably produce a capacitor having a large capacitance per unit mass, low equivalent series resistance (ESR), good leakage current characteristics and excellent moisture resistance, and also relates to a capacitor using the same and production methods thereof.

BACKGROUND ART

Capacitors for use in electronic instruments such as portable telephone and personal computer are demanded to have a small size and a large capacitance. Among these capacitors, a tantalum capacitor is preferred because of its large capacitance for the size and good performance.

Moreover, recent electronic devices are demanded to operate at a low voltage and high frequency with low noise, and also a lower equivalent series resistance (ESR) is required for a solid electrolyte capacitor.

In this tantalum capacitor, a sintered body of tantalum powder is generally used for the anode moiety. This powder is molded and then sintered, whereby the powder is integrated and works out to an electrode called a sintered body. The inside of this sintered body takes a three-dimensional complicated form resulting from the particles of the powder being electrically and mechanically connected with each other. On the surface of this sintered body including the surface of the inside void, a dielectric film layer is formed and thereinto, a material as a counter electrode is impregnated, whereby a capacitor is fabricated. As long as the dielectric film layer uniformly adheres to the inside or outside surface of the sintered body, the capacitance of the capacitor manufactured greatly depends on, microscopically, the contact state of the counter electrode material with the dielectric film layer.

In order to increase the capacitance of the tantalum capacitor, it is necessary to increase the mass of the sintered body or to use a sintered body increased in the surface area by pulverizing the tantalum powder.

The method of increasing the mass of the sintered body necessarily involves enlargement of the capacitor shape and cannot satisfy the requirement for downsizing. On the other hand, in the method of pulverizing tantalum powder to increase the specific surface area, the pore diameter of the tantalum sintered body decreases or closed pores increase at the stage of sintering, as a result, impregnation of the cathode agent at a later step becomes difficult.

For example, assuming that when an aqueous phosphoric acid solution is used as a counter electrode material, the contact state of the solution with a dielectric film layer is complete and the capacitance appearance ratio (also called a cathode agent impregnation ratio) at the time is 100%, a capacitance appearance ratio of 100% can be hardly attained in the case of using a counter electrode material having high viscosity, particularly a solid electrode material. In particular, when the average particle size of tantalum powder is small or the sintered body manufactured from a tantalum powder has a large shape, the difficulty increases and in an extreme case, the capacitance appearance ratio cannot reach even 50%. With such a low capacitance appearance ratio, the capacitor manufactured cannot have a sufficiently high moisture resistance.

In case the tantalum powder to produce a tantalum sintered body has a small pore diameter, it essentially leads to a small pore diameter of the tantalum sintered body and a low capacitance appearance ratio. Consequently, a problem arises that an ESR cannot be lowered.

As one of means for solving these problems, a capacitor using a sintered body as an electrode may be considered, which sintered body is produced using an electrode material providing a dielectric material having a dielectric constant larger than that of tantalum and gives a high capacitance appearance ratio.

As such an electrode material which can be supplied industrially, niobium having a dielectric constant larger than that of tantalum and having a large reserve is known.

JP-A-55-157226 (the term "JP-A" as used herein means an "unexamined published Japanese patent application") discloses a method for producing a sintered device for capacitors, where agglomerated valve-acting metal powder having a particle size of 2.0 μm or less is molded under pressure and then sintered, the molded and sintered body is cut into fine pieces, a lead part is joined therewith and these are again sintered. However, the details on the producing method and properties of the niobium capacitor are not described in this patent publication.

U.S. Pat. No. 4,084,965 discloses a capacitor using a sintered body of niobium powder having an average particle size of 5.1 μm obtained by hydrogenating and pulverizing a niobium ingot. However, the capacitor disclosed has a large leakage current (hereinafter sometimes simply referred to as "LC") value and is of little practical use.

JP-A-10-242004 discloses a technique of partially nitriding a niobium powder and thereby improving the LC value.

JP-A-2000-119710 discloses a producing method of a niobium powder of high purity by two-step reducing reactions; i.e. after charging niobium pentoxide in a melted magnesium and subjecting the niobium pentoxide to reducing reaction, the produced $NbO_x$ (x=0.5 to 1.5) was taken out and subsequently charged in a melted magnesium and subjected to reducing reaction to obtain a niobium metal.

The tapping density of a niobium powder such as niobium monoxide for a capacitor is an important factor in molding operation of the niobium powder. The tapping density of conventional niobium powder is 2.5 g/ml or more, specifically about 4 g/ml, and this is insufficient for the molding.

That is, if such a niobium monoxide powder is molded and sintered to prepare a sintered body, the niobium monoxide powder poorly flows from the hopper of a molding machine to the mold and it is difficult to weigh a constant amount of niobium monoxide powder and flow it into the mold. As a result, it causes problems such that the shape of the molded article is not satisfactorily stabilized, the molded article and the sintered body are deficient in the strength, and a capacitor having bad LC is produced frequently. If a special molding apparatus capable of also handling a powder having bad flowability is used, the molding cost excessively increases and this is not practical.

As such, conventionally known niobium monoxide powder for capacitors has a problem that the powder cannot be fully adapted to continuous molding and the productivity of capacitors is low.

DISCLOSURE OF THE INVENTION

The object of the present invention is to provide a capacitor having a large capacitance per unit mass, low equivalent series resistance (ESR), small leakage current and high moisture resistance; a sintered body usable as the electrode material of this capacitor and capable of giving a high capacitance appearance ratio; a niobium monoxide powder being preferred as the material for this sintered body, exhibiting good flowability in the molding operation, facilitating continuous molding and enabling stable production of capacitors; and the production methods of the capacitor, the sintered body and the niobium powder.

As a result of extensive investigations to solve the above-described problems, the present inventors have found that when a niobium monoxide sintered body having a specific pore distribution, preferably having a plurality of pore diameter peak tops in the pore distribution is used for the capacitor electrode, a high capacitance appearance ratio can be obtained and a capacitor having small leakage current and good moisture resistance can be produced. The present inventors also have found that a niobium monoxide powder preferably having a tapping density of 0.5 to 2.5 g/ml, more preferably having an average particle size of 10 to 1,000 µm exhibits good flowability, enables continuous molding and is preferred as the material for the above-described sintered body and when this niobium monoxide powder is used, a capacitor having small leakage current can be stably produced.

The present inventors have found that more preferably, both a high capacitance appearance ratio and low ESR can be achieved with a capacitor wherein the electrodes use a niobium monoxide sintered body produced by using a niobium monoxide powder having a wide range of pore distribution and a plural pore diameter peak tops all of which are 0.5 µm or more.

More specifically, the present invention relates to the following niobium monoxide powder, niobium monoxide sintered body, capacitor using thereof, and production methods thereof.

1. A niobium monoxide powder for a capacitor represented by formula: $NbO_x$ (x=0.8 to 1.2) having a tapping density of 0.5 to 2.5 g/ml.

2. The niobium monoxide powder as described in 1 above, further containing at least one element other than niobium selected from the group consisting of magnesium, calcium, strontium, barium, scandium, yttrium, lanthanum, cerium, praseodymium, neodymium, samarium, europium, gadolinium, terbium, dysprosium, holmium, erbium, thulium, ytterbium, lutetium, titanium, zirconium, hafnium, vanadium, tantalum, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, sulfur, selenium and tellurium 3. The niobium monoxide powder as described in 1 or 2 above, wherein the element other than niobium forms complex oxide with niobium.

4. The niobium monoxide powder as described in 2 or 3 above, wherein the other elements are contained in an amount of 50 to 200,000 ppm.

5. The niobium monoxide powder as described in any one of 1 to 4 above, wherein the average particle size is from 10 to 1,000 µm.

6. The niobium monoxide powder as described in any one of 1 to 5 above, wherein the angle of repose is from 10° to 60°.

7. The niobium monoxide powder as described in any one of 1 to 6 above, wherein the BET specific surface area is from 0.5 to 40 $m^2/g$.

8. The niobium monoxide powder as described in any one of 1 to 7 above, which has a pore distribution having a pore diameter peak top in the range of 0.01 µm to 500 µm.

9. The niobium monoxide powder as described in 8 above, wherein the pore distribution has a plurality of pore diameter peak tops.

10. The niobium monoxide powder as described in 8 or 9 above, wherein any of the pore diameter peak tops is in the range of 0.5 to 100 µm.

11. A sintered body using the niobium monoxide powder described in any one of 1 to 10 above.

12. The sintered body as described in 11 above, which has a pore distribution having a pore diameter peak top in the range of 0.01 µm to 500 µm.

13. A niobium monoxide sintered body for a capacitor electrode, wherein the pore distribution of the niobium monoxide sintered body has a plurality of pore diameter peak tops.

14. The niobium monoxide sintered body as described in any one of 11 to 13 above, wherein the pore distribution has two pore diameter peak tops.

15. The niobium monoxide sintered body as described in 13 or 14 above, wherein among the plurality of pore diameter peak tops, the peak tops of the two peaks having a highest relative intensity are present in the range of 0.2 to 0.7 µm and in the range of 0.7 to 3 µm respectively.

16. The niobium monoxide sintered body as described in 13 above, wherein among the plurality of pore diameter peak tops, the peak top of the peak having a highest relative intensity is present in the larger diameter side than the peak top of the peak having a next highest relative intensity.

17. The niobium monoxide sintered body as described in any one of 11 to 16 above, wherein the sintered body has a volume of 10 $mm^3$ or more including the volume of pore void.

18. The niobium monoxide sintered body as described in any one of 11 to 17 above, wherein the sintered body has a specific surface area of 0.2 to 7 $m^2/g$.

19. The niobium monoxide sintered body as described in any one of 11 to 18 above, wherein a part of the sintered body is nitrided.

20. The niobium sintered body as described in any one of 11 to 19 above, wherein the sintered body is a sintered body obtained from a niobium monoxide molded article which gives a sintered body having a CV value of 40,000 to 200,000 µFV/g when sintered at 1,400° C.

21. A capacitor comprising one electrode using the niobium monoxide sintered body described in any one of 11 to 20 above, a counter electrode and a dielectric material interposed therebetween.

22. The capacitor as described in 21 above, wherein the dielectric material mainly comprises niobium pentoxide.

23. The capacitor as described in 21 above, wherein the counter electrode is at least one material selected from the group consisting of an electrolytic solution, an organic semiconductor and an inorganic semiconductor.

24. The capacitor as described in 23 above, wherein the counter electrode is an organic semiconductor and the organic semiconductor is at least one material selected from the group consisting of an organic semiconductor comprising a benzopyrroline tetramer and chloranile, an organic semiconductor mainly comprising tetrathiotetracene, an organic semiconductor mainly comprising tetracyanoquino-dimethane, and an electrically conducting polymer.

25. The capacitor as described in 24 above, wherein the electrically conducting polymer is at least one member selected from the group consisting of polypyrrole, polythiophene, polyaniline and substitution derivatives thereof.

26. The capacitor as described in 24 above, wherein the electrically conducting polymer is an electrically conducting polymer obtained by doping a dopant into a polymer containing a repeating unit represented by the following formula (1) or (2):

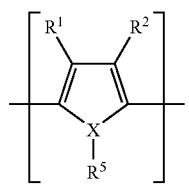
(1)

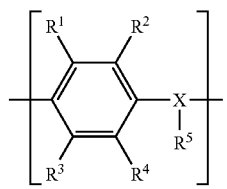
(2)

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; each of the pairs of $R^1$ and $R^2$, and $R^3$ and $R^4$ may combine at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; $R^5$ is present only when X is a nitrogen atom, and independently represents a hydrogen atom or a linear or branched, saturated or unsaturated alkyl group having from 1 to 10 carbon atoms.

27. The capacitor as described in 26 above, wherein the electrically conducting polymer is an electrically conducting polymer containing a repeating unit represented by the following formula (3):

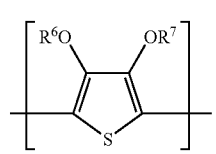
(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements resulting from the alkyl groups combining with each other at an arbitrary position; and the cyclic structure includes a structure having a vinylene bond which may be substituted, and a phenylene structure which may be substituted.

28. The capacitor as described in 27 above, wherein the electrically conducting polymer is an electrically conducting polymer obtained by doping a dopant into poly(3,4-ethylenedioxythiophene).

29. The capacitor as described in 21 above, wherein the counter electrode is formed of a material at least partially having a layer structure.

30. The capacitor as described in 21 above, wherein the material of the counter electrode contains an organic sulfonate anion as a dopant.

31. A method for producing the niobium monoxide powder described in any one of 1 to 10 above, comprising activation-treatment (also called "pore forming treatment") of niobium monoxide or a niobium monoxide compound.

32. The method for producing the niobium monoxide powder as described in 31 above, wherein the activation treatment of niobium monoxide or a niobium monoxide compound is performed by at least one step selected from the group consisting of a sintering step and a cracking step.

33. The method for producing the niobium monoxide powder as described in 31 or 32 above, wherein the activation treatment of niobium monoxide or a niobium monoxide compound is performed using a mixture of niobium monoxide or a niobium monoxide compound and an activator.

34. The method for producing the niobium monoxide powder as described in any one of 31 to 33 above, wherein the average particle size of the niobium monoxide or niobium monoxide compound processed with the activation treatment is from 0.01 μm to 10 μm.

35. The method for producing the niobium monoxide powder as described in any one of 31 to 34 above, wherein the niobium monoxide or niobium monoxide compound contains at least one element selected from the group consisting of magnesium, calcium, strontium, barium, scandium, yttrium, lanthanum, cerium, praseodymium, neodymium, samarium, europium, gadolinium, terbium, dysprosium, holmium, erbium, thulium, ytterbium, lutetium, titanium, zirconium, hafnium, vanadium, tantalum, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, sulfur, selenium and tellurium in an amount of 50 to 200,000 ppm.

36. The method for producing the niobium monoxide powder as described in 35 above, wherein the other element than niobium contained in the niobium monoxide or niobium monoxide compound forms complex oxide with niobium.

37. The method for producing the niobium monoxide powder as described in 33 above, wherein the mixture containing niobium monoxide or a niobium monoxide compound and an activator is obtained by mixing these using a solvent.

38. The method for producing the niobium monoxide powder as described in 37 above, wherein the solvent is at least one solvent selected from the group consisting of water, alcohols, ethers, cellosolves, ketones, aliphatic hydrocarbons, aromatic hydrocarbons and halogenated hydrocarbons.

39. The method for producing the niobium monoxide powder as described in 33 above, wherein the activator is used in an amount of 1 to 40 mass % based on the total amount of the niobium monoxide or niobium monoxide compound.

40. The method for producing the niobium monoxide powder as described in 33 or 39 above, wherein the average particle size of the activator is from 0.01 μm to 500 μm.

41. The method for producing the niobium monoxide powder as described in any one of 33, 37, 39 and 40 above, wherein the activator has a plurality of particle size peak tops.

42. The method for producing the niobium monoxide powder as described in any one of 33, 37 or 39 to 41 above, wherein the activator is a substance which is removed as a gas at 2,000° C. or less.

43. The method for producing the niobium monoxide powder as described in 42 above, wherein the activator is at least one member selected from the group consisting of naphthalene, anthracene, quinone, camphor, polyacrylic acid, polyacrylic acid ester, polyacrylamide, polymethacrylic acid, polymethacrylic acid ester, polymethacrylamide, polyvinyl alcohol, $NH_4Cl$, $ZnO$, $WO_2$, $SnO_2$ and $MnO_3$.

44. The method for producing the niobium monoxide powder as described in any one of 33, 37 or 39 to 41 above, wherein the activator is at least one member selected from the group consisting of a water-soluble substance, an organic solvent-soluble substance, an acidic solution-soluble substance, an alkaline solution-soluble substance, a substance which forms a complex and becomes a substance soluble in water, organic solvent, acidic solution or alkaline solution, and a substance which becomes a substance soluble in water, organic solvent, acidic solution or alkaline solution at 2,000° C. or less.

45. The method for producing the niobium monoxide powder as described in 44 above, wherein the activator is at least one member selected from the group consisting of compounds of a metal with carbonic acid, sulfuric acid, sulfurous acid, halogen, perhalogen acid, hypohalogen acid, nitric acid, nitrous acid, phosphoric acid, acetic acid, oxalic acid or boric acid, metals, metal hydroxides and metal oxides.

46. The method for producing the niobium monoxide powder as described in 45 above, wherein the activator is at least one member selected from the group consisting of metal carbon oxide, metal hydrogen carbonate, metal hydroxide and metal oxide.

47. The method for producing the niobium monoxide powder as described in 46 above, wherein the activator is at least one, member selected from the group consisting of metal carbon oxide, metal hydrogen carbonate, metal hydroxide and metal oxide and has a melting point higher than the temperature at a sintering step.

48. The method for producing the niobium monoxide powder as described in 44 above, wherein the activator is at least one member selected from the group consisting of lithium, sodium, potassium, rubidium, cesium, francium, beryllium, magnesium, calcium, strontium, barium, radium, scandium, yttrium, lanthanum, cerium, praseodymium, neodymium, samarium, europium, gadolinium, terbium, dysprosium, holmium, erbium, thulium, ytterbium, lutetium, titanium, zirconium, hafnium, vanadium, niobium, tantalum, molybdenum, tungsten, manganese, rhenium, ruthenium, osmium, cobalt, rhodium, iridium, nickel, palladium, platinum, silver, gold, zinc, cadmium, boron, aluminum, gallium, indium, thallium, carbon, silicon, germanium, tin, lead, arsenic, antimony, bismuth, selenium, tellurium, polonium and a compound thereof.

49. The method for producing the niobium monoxide powder as described in any one of 31 to 33 above, wherein the activation treatment is a treatment of removing the activator by heating and/or under reduced pressure before or during the sintering step.

50. The method for producing the niobium monoxide powder as described in any one of 31 to 33 above, wherein the activation treatment is a treatment of removing the activator component by contacting a solvent with the sintered or cracked product after the sintering step and during or after the cracking step.

51. The method for producing the niobium monoxide powder as described in 50 above, wherein the solvent is at least one member selected from the group consisting of water, an organic solvent, an acidic solution, an alkaline solution and a solution containing a ligand of forming a soluble complex.

52. The method for producing the niobium monoxide powder as described in 51 above, wherein the acidic solution is a solution of at least one member selected from the group consisting of nitric acid, sulfuric acid, hydrofluoric acid and hydrochloric acid.

53. The method for producing the niobium monoxide powder as described in 51 above, wherein the alkaline solution contains at least one member selected from the group consisting of an alkali metal hydroxide and ammonia.

54. The method for producing the niobium monoxide powder as described in 51 above, wherein the ligand is at least one member selected from the group consisting of ammonia, glycine and ethylenediaminetetraacetic acid.

55. A method for producing a nitrogen-containing niobium monoxide powder, comprising treating the niobium monoxide powder described in any one of 1 to 10 above by at least one method selected from the group consisting of liquid nitridation, ion nitridation and gas nitridation.

56. A method for producing a carbon-containing niobium monoxide powder, comprising treating the niobium monoxide powder described in any one of 1 to 10 above by at least one method selected from the group consisting of solid phase carbonization and liquid carbonization.

57. A method for producing a boron-containing niobium monoxide powder, comprising treating the niobium monoxide powder described in any one of 1 to 10 above by at least one method selected from the group consisting of gas boronization and solid phase boronization.

58. A method for producing a sulfur-containing niobium monoxide powder, comprising treating the niobium monoxide powder described in 1 or 10 above by at least one method selected from the group consisting of gas sulfudization, ion sulfudization and solid phase sulfudization.

59. A niobium monoxide powder obtained by the production method described in any one of 31 to 58 above.

60. A method for producing a niobium monoxide sintered body, using the niobium monoxide powder described in any one of 1 to 10 and 59 above.

61. A method for producing a capacitor comprising one electrode using a niobium monoxide sintered body, a dielectric material formed on the surface of the sintered body and a counter electrode provided on the dielectric material, wherein the niobium monoxide sintered body is obtained by sintering the niobium monoxide powder described in any one of 1 to 10 and 59 above.

62. The method for producing a capacitor as described in 61 above, wherein the dielectric material is formed by electrolytic oxidation.

63. A method for producing a capacitor comprising one electrode using a niobium monoxide sintered body, a dielectric material formed on the surface of the sintered body and a counter electrode provided on the dielectric material, wherein the niobium monoxide sintered body is the niobium monoxide sintered body described in any one of 11 to 20 above.

64. An electronic circuit using the capacitor described in any one of 21 to 30 above.

65. An electronic instrument using the capacitor described in any one of 21 to 30 above.

MODE FOR CARRYING OUT THE INVENTION

The capacitor having a large capacitance, low equivalent series resistance (ESR), good leakage current characteristics and excellent moisture resistance, the niobium monoxide sintered body which enables these properties and giving a high capacitance appearance ratio, the niobium monoxide powder preferred as a material for the sintered body, having, good flowability and capable of continuous molding, and the production methods of the capacitor, the niobium sintered body and the niobium powder are described below.

In the present invention, a niobium monoxide powder for capacitors (sometimes simply referred to as a "niobium monoxide powder") having a tapping density of 0.5 to 2.5 g/ml is used as the niobium monoxide powder which satisfies the above-described properties of a capacitor and improves the productivity in the production of capacitors.

The niobium monoxide powder for capacitors as used herein means a niobium monoxide powder mainly comprising $NbO_x$, wherein x=0.8 to 1.2, and capable of being a material for producing a capacitor.

As niobium oxide, three kinds are known, which are niobium monoxide, niobium dioxide and niobium pentoxide.

In a niobium oxide wherein x is from 0 to 1, metal niobium and niobium monoxide coexist. As metal niobium is more ready to be sintered than niobium monoxide, it becomes difficult to have a large specific surface area of the sintered body when there exists a large amount of metal niobium and it leads to decrease the capacitance of the capacitor.

In a niobium oxide wherein x is from 1 to 2, niobium monoxide and niobium dioxide coexist. Niobium dioxide is insulating while niobium monoxide is electrically conductive. In the case where niobium dioxide exists in a large amount, it becomes disadvantageous for forming a dielectric material by electrolytic oxidation.

Considering these, the range of x is preferably from 0.8 to 1.2, more preferably from 0.9 to 1.1, and still more preferably from 0.95 to 1.05.

Niobium monoxide powder may contain at least one of component capable of forming complex oxide with niobium or component other than niobium such as nitrogen, phosphorus, antimony, sulfur, selenium and tellurium. By containing a component other than niobium in a niobium monoxide powder, it enables to change the sinterability and to improve the properties of a capacitor. Such elements other than niobium includes magnesium, calcium, strontium, barium, scandium, yttrium, lanthanum, cerium, praseodymium, neodymium, samarium, europium, gadolinium, terbium, dysprosium, holmium, erbium, thulium, ytterbium, lutetium, titanium, zirconium, hafnium, vanadium, tantalum, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, sulfur, selenium and tellurium.

For example, a sintered body for capacitors can be obtained by molding and sintering the niobium monoxide powder using a method as follows.

The niobium monoxide powder for capacitors is added to a solution obtained by dissolving a binder which is described later, in an organic solvent such as toluene or methanol, and thoroughly mixed using a shaking mixer or a V-type mixer. Then, the organic solvent is distilled off under reduced pressure using a drier such as conical drier to prepare a niobium monoxide mixed powder containing the binder. This mixed powder is charged into the hopper of an automatic molding machine, weighed while flowing the niobium powder through an inlet tube from the hopper to the metal mold of the molding machine to automatically cause spontaneous falling in the metal mold, and molded together with a lead wire. After removing the binder, this molded article is sintered at 500 to 2,000° C. under reduced pressure to manufacture a niobium monoxide sintered body.

The niobium monoxide sintered body is electrochemically formed, for example, in an electrolyte solvent such as phosphoric acid and adipic acid of a concentration of about 0.1% by mass and 30° C. to 90° C. at a voltage from 20 to 60 V for 1 to 30 hours to form a dielectric layer mainly comprising diniobium pentoxide. A solid electrolyte layer such as manganese dioxide, lead dioxide and conductive polymer and a graphite layer and a silver paste layer are formed on the dielectric layer. After a cathode terminal is connected thereon by soldering or the like, these are sealed with a resin to fabricate a solid electrolyte capacitor.

In the case of a mixed, powder having no appropriate flowability or angle of repose in molding, the powder does not smoothly flow from the hopper to the metal mold and the molding cannot be stably performed. In particular, since the mixed powder is transported from the hopper using a method such as vibration, too large or too small tapping density or average particle size of the mixed powder leads to large dispersion in the mass of the molded article or in the strength or shape of the sintered body and in some cases, to the generation of chipping or cracking, resulting in a bad leakage current value. Thus, the tapping density, the average particle size, the flowability and the angle of repose of the mixed powder are important factors for producing a good sintered body and a good capacitor.

These physical properties of the mixed powder scarcely change between before and after the mixing with a binder but are determined by the physical properties of the niobium monoxide powder for capacitors used. Accordingly, important are the tapping density, the average particle size, the flowability and the angle of repose of the niobium monoxide powder used. The flowability and the angle of repose of the niobium monoxide powder are greatly affected by the tapping density or the average particle size and therefore, the tapping density and the average particle size become important factors.

In the present invention, for increasing the productivity and the strength of the sintered body accompanying the improvement of the flowability or the angle of repose and thereby obtaining an effect of reducing the leakage current, the tapping density is preferably from 0.5 to 2.5 g/ml, more preferably from 0.7 to 1.9 g/ml, and still more preferably from 0.7 to 1.6 g/ml. The average particle size of the niobium monoxide powder of the present invention is preferably from 10 to 1,000 μm, more preferably from 50 to 200 μm.

For allowing the niobium monoxide powder to spontaneously fall from the hopper to the metal mold of a molding machine, the angle of repose of the niobium monoxide powder of the present invention is preferably from 10° to 60°, more preferably from 10° to 50°.

The niobium monoxide powder having the above-described physical properties can be produced starting from a mixture (hereinafter referred to as "a starting material mixture") containing a niobium monoxide powder or a niobium monoxide compound powder (hereinafter these are called "a starting material niobium monoxide powder") and an activator (also called "pore forming material", and hereinafter sometimes referred to as "an additive") through at least a sintering step and a cracking step in sequence.

The activator is removed at either the sintering step or the cracking step during the production of the niobium monoxide powder of the present invention from the starting material mixture. The removal of the activator may also be performed independently from the sintering step or the cracking step.

Various methods for removing the activator can be arbitrarily employed according to the chemical properties of the activator. One of the methods capable of easily removing the activator may be used or a plurality of these methods may be used in combination.

Examples of the method for removing the activator include a method of evaporating, sublimating or thermally decomposing the activator and removing it as a gas, and a method of removing the activator by dissolving it in a solvent.

In the case of removing the activator as a gas, the removal may be performed at the sintering step, or a step of removing the activator under heating and/or reduced pressure may be provided before the sintering.

In the case of removing the activator by dissolving it in a solvent after the sintering of the starting material mixture or during or after the cracking, a solvent which is described later is contacted with the sintered product or a cracked product thereby dissolving and removing the activator.

A step of nitriding, boronizing, carbonizing or sulfudizing a part of niobium monoxide powder may be provided at any stage in the process of producing the niobium monoxide powder of the present invention from the starting material mixture.

The method for producing the niobium monoxide powder of the present invention is described in detail below.

The starting material niobium monoxide powder may be at least one powder selected from niobium monoxide ($NbO_x$) (x=0.8 to 1.2), niobium monoxide containing at least one element other than niobium selected from the group consisting of magnesium, calcium, strontium, barium, scandium, yttrium, lanthanum, cerium, praseodymium, neodymium, samarium, europium, gadolinium, terbium, dysprosium, holmium, erbium, thulium, ytterbium, lutetium, titanium, zirconium, hafnium, vanadium, tantalum, molybdenum, tungsten, manganese, rhenium, ruthenium, osmium, rhodium, iridium, palladium, platinum, silver, gold, zinc, cadmium, mercury, boron, aluminum, gallium, indium, thallium, carbon, silicon, germanium, tin, lead, nitrogen, phosphorus, arsenic, antimony, bismuth, sulfur, selenium and tellurium and a complex oxide thereof. A part of the powder may be nitrided, sulfudized, carbonized or boronized.

The average particle size of the starting material niobium monoxide powder used in the present invention is preferably from 0.01 to 10 μm, more preferably 0.02 to 5 μm, still more preferably from 0.05 to 2 μm.

In consideration of the sinterability and improvement of the electric properties of the obtained capacitors, the amount of the other elements is preferably from 50 mass ppm to 500,000 mass ppm, more preferably from 50 to 200,000 mass ppm.

Examples of the method for obtaining niobium monoxide used as the starting material niobium monoxide powder include a method of reducing diniobium pentoxide using a metal having reducing activity such as calcium and magnesium, a method of reducing niobium dioxide powder by heating in hydrogen flow and a method of heating the mixture of a niobium metal powder and a niobium dioxide powder in argon.

Examples of the method for obtaining niobium monoxide used as the starting material niobium monoxide powder include a method of reducing the niobium complex oxide with other elements, mixture of niobium pentoxide and oxide of other elements or oxide of niobium dioxide and other elements by heating in hydrogen flow or by using a metal having reducing activity such as, calcium, magnesium, yttrium, lanthanum, cerium, samarium, and misch metal, a method of oxidizing the alloy of niobium and other elements in air, a method of heating the mixture of niobium monoxide powder and compound of other elements and a method of reacting other elements in the shape of gas, liquid or solid with niobium monoxide. The particle size of the obtained powder can be adjusted by a conventional pulverization method.

For example, methods to obtain a niobium monoxide powder containing boron as other element include a method of mixing a boronized niobium powder and a niobium monoxide powder and heating the mixture, a method of heating a boronized niobium powder in air and a method of reacting boron gas and niobium monoxide by heating.

The activator is a substance which can be removed at any step during the production of the niobium monoxide powder of the present invention from the starting material mixture. In the niobium monoxide powder of the present invention, a pore is usually formed in the portion where the activator is removed.

The particle size of the activator affects the pore diameter of the niobium monoxide powder of the present invention, the pore diameter of the niobium monoxide powder affects the pore diameter of the niobium monoxide sintered body, and the pore diameter of the sintered body affects the capacitance of a capacitor and the impregnating ability of a cathode agent in the production step of a capacitor.

The impregnating ability of a cathode agent has a great influence in producing a capacitor with a high capacitance as well as a low ESR. As a niobium monoxide sintered body is produced by molding a niobium monoxide powder under pressure, the pore diameter of the sintered body is naturally smaller than that of the niobium monoxide powder. Considering the difficulty to impregnate a cathode agent to a sintered body produced from a niobium monoxide powder having a small pore diameter, the average pore diameter of a niobium monoxide powder is preferably 0.5 μm or more, and more preferably 1 μm or more.

The average pore diameter, of the niobium monoxide powder is preferably from 0.01 to 500 μm more preferably from 0.03 to 300 μm, still more preferably from 0.1 to 200 μm. For having a pore diameter in this range, the average particle size of the activator is preferably from 0.01 to 500 μm, more preferably from 0.03 to 300 μm, still more preferably from 0.1 to 200 μm.

The average pore diameter of the niobium monoxide powder is most preferably from 0.5 µm to 100 µm, and the average particle size of the activator is most preferably from 0.5 to 100 µm.

The pore diameter may be reduced by using an activator having a small particle size and the pore diameter may be increased by using an activator having a large particle size.

The pore diameter distribution can be adjusted by adjusting the particle size distribution of the activator.

In order to obtain a capacitor having a sufficiently large capacitance and free from problems involved in the impregnating ability of a cathode agent, it is preferred to appropriately provide pores small enough to give a desired capacitance and pores large enough to ensure satisfactory impregnation of a cathode agent, in the niobium monoxide sintered body according to the physical properties of the cathode agent.

For adjusting the pore diameter distribution of the niobium monoxide powder or niobium monoxide sintered body, for example, the niobium monoxide powder can be made to have a pore diameter distribution having two or more peak tops by using an activator (powder) with a particle size distribution with two or more peak tops. By sintering this niobium monoxide powder, a niobium monoxide sintered body having two or more peak tops of equal pore diameter in the pore diameter distribution can be obtained. In this case, the pore diameter peak top is preferably present in the range of 0.01 to 500 µm, more preferably from 0.03 to 300 µm, still more preferably from 0.1 to 200 µm, particularly preferably from 0.1 to 30 µm and most preferably from 0.2 to 3 µm.

The niobium monoxide powder to produce the niobium monoxide sintered body in above has a two or more peak tops in the particle size distribution. Any of the two or more peak tops is preferably 0.5 µm or more. For example, to produce a niobium monoxide sintered body having two peak tops in the particle size distribution of 0.7 and 3 µm, the two peak tops of the niobium monoxide powder may be adjusted to about 1.5 and about 25 µm. To obtain a niobium monoxide powder having a small pore diameter of 1.5 µm and having a large pore diameter of 25 µm, the activator having an average pore diameter of 1.5 µm and 25 µm is to be used respectively. Generally, when a pore of a small diameter and that of a large diameter are present in the niobium monoxide powder, a pore of a large diameter becomes small during molding under pressure. Therefore, a peak top of a large diameter is preferably 20 µm or more. Also, preferably 30% by volume or more of the entire pore volume has a pore diameter of 20 µm or more, and more preferably 40% by volume or more.

The activator having two or more peak tops in the particle size distribution can be obtained, for example, by mixing two or more activators having a different peak top in the particle size distribution.

Examples of the substance as the activator include a substance which becomes a gas at the sintering temperature or lower, and a substance which is soluble in a solvent at least after the sintering.

Examples of the substance which becomes a gas at the sintering temperature or lower include a substance which becomes a gas through evaporation, sublimation or thermal decomposition. An inexpensive substance capable of easily becoming a gas even at a low temperature without leaving a residue is preferred. Examples thereof include aromatic compounds such as naphthalene, anthracene and quinone, camphor, $NH_4Cl$, $ZnO$, $WO_2$, $SnO_2$, $MnO_3$ and organic polymers.

Examples of the organic polymer include polyacrylic acid, polyacrylic acid ester, polyacrylamide, polymethacrylic acid, polymethacrylic acid ester, polymethacrylamide and polyvinyl alcohol.

The substance which is soluble at least after the sintering is a substance such that the residue of the activator or a thermally decomposed product thereof is soluble in a solvent. A substance capable of easily dissolving in a solvent which is described later, after the sintering, or during or after the cracking is particularly preferred. Such a substance can be selected from many substances according to the combination with the solvent.

Examples thereof include compounds of a metal with carbonic acid, sulfuric acid, sulfurous acid, halogen, perhalogen acid, hypohalogen acid, nitric acid, nitrous acid, phosphoric acid, acetic acid, oxalic acid or boric acid, metal oxides, metal hydroxides and metals.

Among these, preferred are compounds having a large solubility in a solvent such as acid, alkali or ammonium salt solution which are described later. Examples thereof include compounds containing at least one member selected from the group consisting of lithium, sodium, potassium, rubidium, cesium, francium, beryllium, magnesium, calcium, strontium, barium, radium, scandium, yttrium, cerium, neodymium, erbium, titanium, zirconium, hafnium, vanadium, niobium, tantalum, molybdenum, tungsten, manganese, rhenium, ruthenium, osmium, cobalt, rhodium, iridium, nickel, palladium, platinum, silver, gold, zinc, cadmium, aluminum, gallium, indium, thallium, germanium, tin, lead, antimony, bismuth, selenium, tellurium, polonium, boron, silicon and arsenic. Among these, preferred are metal salts and more preferred are, for example, barium oxide, manganese(II) nitrate and calcium carbonate.

These activators may be used individually or in combination of two or more thereof.

To form a specific pore diameter efficiently, a substance which exists as a solid at a sintering temperature is preferable as the material of the activator. The reason is that the activator being present in a solid state at a sintering temperature blocks excessive agglomeration of the primary niobium monoxide powder and allows the fusion of the niobium monoxide powder only at a contact point to each other. If the activator exists as a liquid or gas at a sintering temperature, it has a small effect to block such agglomeration and may form a smaller pore than desired. Consequently, a pore diameter becomes more stable with an activator comprising a substance of a higher melting point such as barium oxide, calcium carbonate, aluminum oxide and magnesium oxide than an activator comprising a substance of a lower melting point such as a zinc metal, tin metal and antimony oxide.

If the activator is added in a small amount, the tapping density and the angle of repose become large, whereas if added in a large amount, the tapping density becomes small and closed pores increase at the stage of sintering. For obtaining a repose angle of 60° or less and a tapping density of 0.5 to 2.5 g/ml without the problem of closed pores at the sintering stage, the amount of the activator added is generally from 1 to 40 mass % or less (unless otherwise indicated, mass % is hereinafter simply referred to as %), preferably from 5 to 25%, more preferably from 10 to 20%, based on the starting material niobium monoxide, though this varies depending on the average particle size of the activator.

The starting material mixture may be obtained by mixing the activator and the niobium monoxide starting material each in the powder form using no solvent or by mixing the activator and the niobium starting material using an appropriate solvent and drying the mixture.

Examples of the solvent which can be used include water, alcohols, ethers, cellosolves, ketones, aliphatic hydrocarbons, aromatic hydrocarbons and halogenated hydrocarbons.

The mixing may be performed using a mixer. As for the mixer, a normal apparatus such as shaking mixer, V-type mixer and Nauter mixer may be used without any problem. The temperature at the mixing is limited by the boiling point and freezing point of the solvent but is generally from −50° C. to 120° C., preferably from −50° C. to 50° C., more preferably from −10° C. to 30° C. The time spent for the mixing is not particularly limited insofar as it is 10 minutes or more, however, the mixing is generally performed for 1 to 6 hours preferably.

In the case of using a solvent, the mixture obtained is dried at lower than 80° C., preferably lower than 50° C., using a conical drier or a compartment drier.

In the case where the activator becomes a gas at the sintering temperature or lower, the activator may be removed at the sintering but a step of forming the activator into a gas and removing it before the sintering may be independently provided by setting the conditions such as temperature, pressure and time period to those of facilitating the removal according to the chemical properties of the activator. In this case, the activator is vaporized, for example, at 100° C. to 800° C. under reduced pressure within a few hours.

The sintering step is performed at 500° C. to 2,000° C., preferably from 800° C. to 1,500° C., more preferably from 1,000° C. to 1,400° C., under reduced pressure or in a reducing atmosphere such as argon. After the completion of sintering, the sintered product is preferably cooled until the niobium monoxide temperature (sometimes simply referred to as a "product temperature") becomes 30° C. or less, an inert gas such as nitrogen or argon containing from 0.01 vol % to 10 vol %, preferably from 0.1 vol % to 1 vol % of oxygen is gradually added such that the product temperature does not exceed 30° C., and after standing for 8 hours or more, the sintered product is taken out to obtain a sintered lump.

In the cracking step, the sintered lump is cracked to an appropriate particle size using a cracking machine such as a roll granulator.

In the case where the activator is soluble in a solvent at least after the sintering step, an appropriate solvent is contacted with the sintered lump or the cracked powder after the sintering and before, during or after the cracking or at a plurality of these steps and thereby, the activator component is dissolved and removed. In view of easiness of the removal, the activator component is preferably dissolved and removed from the cracked powder after cracking.

The solvent used here is a solvent in which the activator to be dissolved has a sufficiently high solubility. A solvent which is inexpensive and hardly remains is preferred. For example, in the case of a water-soluble activator, water may be used; in the case of an organic solvent-soluble activator, an organic solvent such as methyl isobutyl ketone, ethanol or dimethyl sulfoxide (DMSO) may be used; in the case of an acid-soluble activator, an acid solution such as nitric acid, sulfuric acid, phosphoric acid, boric acid, carbonic acid, hydrofluoric acid, hydrochloric acid, hydrobromic acid, hydroiodic acid or organic acid may be used; in the case of an alkali-soluble activator, an alkali solution such as hydroxide of alkali metal, hydroxide of alkaline earth metal or ammonia may be used; and in the case of an activator which forms a soluble complex, a solution of an amine such as ammonia or ethylenediamine, an amino acid such as glycine, a polyphosphoric acid such as sodium tripolyphosphate, a crown ether, a thiosulfate such as sodium thiosulfate, or a chelating agent such as ethylenediaminetetraacetic acid, which becomes a ligand of the complex, may be used.

A solution of an ammonium salt such as ammonium chloride, ammonium nitrate and ammonium sulfate, cation exchange resin and anion exchange resin may also be used suitably. It is preferable to dissolve and remove the activator at a lower temperature, preferably 50° C. or lower, more preferably from −10° C. to 40° C. and still more preferably from 0° C. to 30° C. Also, it is preferable to select a method generating little heat in dissolving and removing. For example, when using a metal oxide or metal as an activator, dissolving and removing by an acid yields heat of neutralization and the temperature may rise too much. Therefore, a method may be selected which generates little heat such as dissolving in water and an organic solvent, forming a soluble complex such by using a solvent of ammonium nitrate salt, and ethylenediaminetetraacetate and dissolving in a solvent containing ion exchange resin.

Specific examples of the combination of an activator and a solvent include barium oxide and water, calcium oxalate and hydrochloric acid, aluminum oxide and aqueous sodium hydroxide solution, hafnium oxide and methyl isobutyl ketone, and magnesium carbonate and aqueous tetrasodium ethylenediaminetetraacetate solution.

After dissolving and removing the activator, the residue is thoroughly washed and dried. For example, in the case where barium oxide is removed with water, the residue is thoroughly washed using an ion-exchanged solution until the electric conductivity of the washing solution is reduced to 5 μS/cm or less. Subsequently, the product is dried at a product temperature of 50° C., or less under reduced pressure. Here, the amount of the remaining activator or solvent component is usually 100 ppm or less, though this varies depending on the washing conditions.

In order to improve the sinterability, the thus-obtained niobium monoxide powder, sintered lump and niobium monoxide starting material powder may be subjected to nitridation, boronization, carbonization or sulfudization of a part of the niobium monoxide powder, or to a plurality of these treatments.

The niobium monoxide powder of the present invention may contain the obtained nitride, boride, carbide or sulfide of niobium monoxide or a plurality of these species. The total content of respective elements of nitrogen, boron, carbon and sulfur varies depending on the shape of the niobium monoxide powder, however, it is from 0 to 200,000 ppm, preferably 50 to 100,000 ppm, more preferably 200 to 20,000 ppm. If the total content exceeds 200,000 ppm, the capacitor produced is deteriorated in the capacitance characteristics and not suitable as a capacitor.

The nitridation of the niobium monoxide powder can be performed by any one of liquid nitridation, ion nitridation and gas nitridation or by a combination thereof. Among these, gas nitridation in a nitrogen gas atmosphere is preferred because the apparatus therefor is simple and the operation is easy. For example, the gas nitridation in a nitrogen gas atmosphere can be attained by allowing the above-described niobium monoxide powder to stand in a nitrogen gas atmosphere. With a nitridation atmosphere temperature of 2,000° C. or less and a standing time of 100 hours or less, a niobium monoxide powder having an objective nitrided amount can be obtained. The treatment time can be shortened by performing the treatment at a higher temperature.

The boronization of the niobium monoxide powder may be either gas boronization or solid phase boronization. For example, the niobium monoxide powder may be boronized by allowing, it to stand together with a boron source such as boron pellet or boron halide (e.g., trifluoroboron), at 2,000° C. or less for from 1 minute to 100 hours under reduced pressure.

The carbonization of the niobium monoxide powder may be any one of gas carbonization, solid phase carbonization and liquid carbonization. For example, the niobium monoxide powder may be carbonized by allowing it to stand together with a carbon source such as carbon material or organic material having carbon (e.g., methane), at 2,000° C. or less for from 1 minute to 100 hours under reduced pressure.

The sulfudization of the niobium monoxide powder may be any one of gas sulfudization, ion sulfudization and solid phase sulfudization. For example, the gas sulfudization in a sulfur gas atmosphere can be attained by allowing the niobium monoxide powder to stand in a sulfur atmosphere. With a sulfudization atmosphere temperature of 2,000° C. or less and a standing time of 100 hours or less, a niobium powder having an objective sulfudized amount can be obtained. The treatment time can be shortened by performing the treatment at a higher temperature.

The BET specific surface area of the thus-obtained niobium monoxide powder of the present invention is usually 0.5 to 40 $m^2/g$, preferably 0.7 to 10 $m^2/g$, more preferably 0.9 to 2 $m^2/g$.

The niobium monoxide powder of the present invention may be a mixture of niobium monoxide powders different in the tapping density, the particle size, the angle of repose, the BET specific surface area, the pore diameter distribution and the treatment by nitridation, boronization, carbonization or sulfudization.

The sintered body of the present invention, which can be used as an electrode for capacitors, is preferably produced, for example, by sintering the above-described niobium monoxide powder of the present invention. For example, the sintered body can be obtained by press-molding the niobium monoxide powder into a predetermined shape and then heating it at from 500° C. to 2,000° C., preferably from 800° C. to 1,500° C., more preferably from 1,000° C. to 1,400° C., for 1 minute to 10 hours under a pressure of $10^{-5}$ to $10^2$ Pa.

The pore size distribution of the sintered body obtained from the niobium monoxide powder of the present invention usually has a pore diameter peak top in the range of 0.01 μm to 500 μm.

By adjusting the applied pressure at the molding to a specific pressure value, the sintered body can have a larger number of pore diameter peak tops than that of the niobium monoxide powder. This applied pressure value varies depending on the press-molding conditions such as physical properties of niobium monoxide powder, shape of a molded article and molding machine, but is in the range from a pressure capable of press-molding to a pressure where pores of the sintered body are not closed. The preferred pressure value can be determined by a preliminary experiment according to the conditions such as the physical properties of the niobium monoxide powder to be molded so as to have a plurality of pore size peak tops. The applied pressure value can be controlled, for example, by controlling the load of the molding machine applied on the molded article.

The pore size distribution of the sintered body preferably has at least two pore size peak tops so as to contain pores small enough to obtain a desired capacitance and pores large enough to ensure satisfactory impregnation of a cathode agent according to the physical properties of the cathode agent. From such a sintered body having a plurality of peak tops in the pore diameter distribution, a capacitor having excellent impregnating ability of a counter electrode and a high capacitance appearance ratio can be produced.

When among a plurality of pore diameter distribution peak tops, the peak tops of two peaks having a highest relative intensity are present in the range from 0.2 to 0.7 μm and in the range from 0.7 μm to 3 μm, respectively, preferably from 0.2 μm to 0.7 μm and from 0.9 μm to 3 μm, respectively, the capacitor produced from this sintered body can have good moisture resistance. Among a plurality of the pore diameter distribution peak tops, the peak top of the peak having a highest relative intensity is preferably present in the larger diameter side than the peak top of the peak having a next highest relative intensity, because the capacitor can have more excellent moisture resistance.

The specific surface area of the thus-produced sintered body is generally from 0.2 $m^2/g$ to 7 $m^2/g$.

Usually, as the shape of the sintered body is larger, the impregnation of a counter electrode is more difficult. For example, in the case where the sintered body has a size of 10 $mm^3$ or more, the sintered body of the present invention having a plurality of peak tops in the pore diameter distribution can be particularly effectively used.

The sintered body of the present invention may be partially nitrided. As for the nitridation method, the method and reaction conditions described above with respect to the niobium monoxide powder can be employed. It is also possible to previously nitride a part of the niobium powder for use of producing a sintered body and nitride a part of the sintered body produced from this niobium monoxide powder.

Such a sintered body usually contains oxygen element of 0.8 to 1.2 mol times of niobium element. The oxygen contained in the sintered body includes oxygen contained in the niobium monoxide powder before the sintering and oxygen added by the natural oxidation after the sintering. In the sintered body of the present invention, the content of elements except for niobium monoxide, element(s) added to niobium monoxide, oxygen and nitrogen is usually 400 mass ppm or less.

As one example, when the sintered body of the present invention is sintered at 1,400° C., the CV value (the product of the electrochemical forming voltage in the electrochemical forming at 80° C. for 120 minutes in an aqueous 0.1 mass % phosphoric acid solution and the capacitance at 120 Hz) is 40,000 to 200,000 μFV/g.

The production of a capacitor device is described below.

For example, a lead wire comprising a valve-acting metal such as niobium or tantalum and having appropriate shape and length is prepared and this lead wire is integrally molded at the press-molding of the niobium monoxide powder such that a part of the lead wire is inserted into the inside of the molded article, whereby the lead wire can work out to a leading line of the sintered body. Or, the niobium powder is molded and sintered without using a lead wire and then, a lead wire separately prepared is connected thereto by welding or the like.

Using this sintered body as one electrode, a capacitor can be produced by interposing a dielectric material between this electrode and a counter electrode. For example, a capacitor is fabricated by using a niobium monoxide sintered body as one electrode, forming a dielectric material on the surface of the sintered body (including the inside surface of pore) and providing a counter electrode on the dielectric material.

The dielectric material used here for the capacitor is preferably a dielectric material mainly comprising niobium oxide, more preferably a dielectric material mainly comprising niobium pentoxide. The dielectric material mainly comprising niobium pentoxide can be obtained, for example, by electrolytically oxidizing the niobium monoxide sintered body as one electrode. For electrolytically oxidizing the niobium monoxide electrode in an electrolytic solution, an aqueous protonic acid solution is generally used, such as aqueous 0.1% phosphoric acid solution, aqueous sulfuric acid solution, aqueous 1% acetic acid solution or aqueous adipic acid solution. In the case of obtaining a niobium oxide dielectric material by electrochemically forming the niobium monoxide electrode in an electrolytic solution as such, the capacitor of the present invention is an electrolytic capacitor and the niobium monoxide electrode serves as an anode.

In the capacitor of the present invention, the counter electrode to the niobium monoxide sintered body is not particularly limited and for example, at least one material (compound) selected from electrolytic solutions, organic semiconductors and inorganic semiconductors known in the art of aluminum electrolytic capacitor, may be used.

Specific examples of the electrolytic solution include a dimethylformamide-ethylene glycol mixed solution having dissolved therein 5 mass % of an isobutyltripropylammonium borotetrafluoride electrolyte, and a propylene carbonate-ethylene glycol mixed solution having dissolved therein 7 mass % of tetraethylammonium borotetrafluoride.

Specific examples of the organic semiconductor include an organic semiconductor comprising benzenepyrroline tetramer and chloranile, an organic semiconductor mainly comprising tetrathiotetracene, an organic semiconductor mainly comprising tetracyanoquinodimethane, and an electrically conducting polymer containing a repeating unit represented by the following formula (1) or (2):

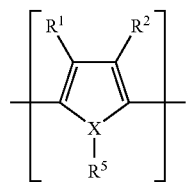

(1)

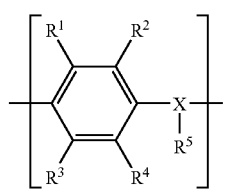

(2)

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; each of the pairs of $R^1$ and $R^2$, and $R^3$ and $R^4$ may combine at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic combined chain may contain a bond of carbonyl, ether, ester, amide, sulfide, sulfinyl, sulfonyl or imino at an arbitrary position; X represents an oxygen atom, a sulfur atom or a nitrogen atom; $R^5$ is present only when X is a nitrogen atom, and independently represents a hydrogen atom or a linear or branched, saturated or unsaturated alkyl group having from 1 to 10 carbon atoms.

In the present invention, $R^1$ to $R^4$ in formula (1) or (2) each independently preferably represents a hydrogen atom or a linear or branched, saturated or unsaturated alkyl or alkoxy group having from 1 to 6 carbon atoms, and each of the pairs of $R^1$ and $R^2$, and $R^3$ and $R^4$ may combine to form a ring.

In the present invention, the electrically conducting polymer containing a repeating unit represented by formula (1) is preferably an electrically conducting polymer containing a structure unit represented by the following formula (3) as a repeating unit:

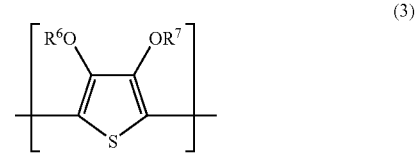

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements resulting from the alkyl groups combining with each other at an arbitrary position; and the cyclic structure includes a structure having a vinylene bond which may be substituted, and a phenylene structure which may be substituted.

The electrically conducting polymer containing such a chemical structure is doped with a dopant and for the dopant, known dopants can be used without limitation.

Specific examples of the inorganic semiconductor include an inorganic semiconductor mainly comprising lead dioxide or manganese dioxide, and an inorganic semiconductor comprising triiron tetraoxide. These semiconductors may be used individually or in combination of two or more thereof.

Examples of the polymer containing a repeating unit represented by formula (1) or (2) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

When the organic or inorganic semiconductor used has an electrical conductivity of $10^{-2}$ S/cm to $10^3$ S/cm, the capacitor produced can have a smaller impedance value and can be increased in the capacitance at a high frequency.

The electrically conducting polymer layer is produced, for example, by a method of polymerizing a polymerizable compound such as aniline, thiophene, furan, pyrrole, methylpyrrole or a substitution derivative thereof under the action of an oxidizing agent capable of satisfactorily undergoing an oxidation reaction of dehydrogenative two-electron oxidation. Examples of the polymerization reaction from the polymerizable compound (monomer) include vapor phase polymerization and solution polymerization. The electrically conducting polymer layer is formed on the surface of the niobium monoxide sintered body having thereon a dielectric material. In the case where the electrically conducting polymer is an organic solvent-soluble polymer capable of solution coating, a method of coating the polymer on the surface of the sintered body to form an electrically conducting polymer layer is used.

One preferred example of the production method using the solution polymerization is a method of dipping the niobium monoxide sintered body having formed thereon a dielectric layer in a solution containing an oxidizing agent (Solution 1) and subsequently dipping the sintered body in a solution containing a monomer and a dopant (Solution 2), thereby performing the polymerization to form an electrically conducting polymer layer on the surface of the sintered body. Also, the sintered body may be dipped in Solution 1 after it is dipped in Solution 2. Solution 2 used in the above-described method may be a monomer solution not containing a dopant. In the case of using a dopant, the dopant may be allowed to be present together in the solution containing an oxidizing agent.

The operation of performing these polymerization steps is repeated once or more, preferably from 3 to 20 times, per niobium monoxide sintered body having thereon a dielectric material, whereby a dense and stratified electrically conducting polymer layer can be easily formed.

In the production method of a capacitor of the present invention, any oxidizing agent may be used insofar as it does not adversely affect the capacitor performance and the reductant of the oxidizing agent can work out to a dopant and elevate the electrically conductivity of the electrically conducting polymer. An industrially inexpensive compound easy to handle at the production is preferred.

Specific examples of the oxidizing agent include Fe(III)-base compounds such as $FeCl_3$, $FeClO_4$ and Fe (organic acid anion) salt; anhydrous aluminum chloride/cuprous chloride; alkali metal persulfates; ammonium persulfates; peroxides; manganeses such as potassium permanganate; quinines such as 2,3-dichloro-5,6-dicyano-1,4-benzoquinone (DDQ), tetrachloro-1,4-benzoquinone and tetracyano-1,4-benzoquinone; halogens such as iodine and bromine; peracid; sulfonic acid such as sulfuric acid, fuming sulfuric acid, sulfur trioxide, chlorosulfuric acid, fluorosulfuric acid and amidosulfuric acid; ozone; and a mixture of a plurality of these oxidizing agents.

Examples of the fundamental compound of the organic acid anion for forming the above-described Fe (organic acid anion) salt include organic sulfonic acid, organic carboxylic acid, organic phosphoric acid and organic boric acid. Specific examples of the organic sulfonic acid include benzenesulfonic acid, p-toluenesulfonic acid, methanesulfonic acid, ethanesulfonic acid, α-sulfonaphthalene, β-sulfonaphthalene, naphthalenedisulfonic acid and alkylnaphthalenesulfonic acid (examples of the alkyl group include butyl, triisopropyl and di-tert-butyl).

Specific examples of the organic carboxylic acid include acetic acid, propionic acid, benzoic acid and oxalic acid. Furthermore, polymer electrolyte anions such as polyacrylic acid, polymethacrylic acid, polystyrene-sulfonic acid, polyvinylsulfonic acid, poly-α-methylsulfonic acid, polyvinylsulfuric acid and polyethylenesulfonic acid and polyphosphoric acid may also be used in the present invention. These organic sulfuric acids and organic carboxylic acids are mere examples and the present invention is not limited thereto. Examples of the counter cation to the above-described anion include alkali metal ions such as $H^+$, $Na^+$ and $K^+$, and ammonium ions substituted by a hydrogen atom, a tetramethyl group, a tetraethyl group, a tetrabutyl group or a tetraphenyl group, however, the present invention is not limited thereto. Among these oxidizing agents, preferred are oxidizing agents containing trivalent Fe-base compounds, cuprous chloride, alkali persulfates, ammonium persulfates or quinones.

For the anion having a dopant ability which is allowed 12 to be present together, if desired, in the production of a polymer composition for the electrically conducting polymer (anion other than the reductant anion of the oxidizing agent), an electrolyte anion having as a counter anion an oxidizing agent anion (a reductant of oxidizing agent) produced from the above-described oxidizing agent, or other electrolyte anion may be used. Specific examples thereof include protonic acid anions including halide anion of Group 5B elements such as $PF_6^-$, $SbF_6^-$ and $AsF_6^{-1}$; halide anion of Group 3B elements such as $BF_4^-$; halogen anion such as $I^-(I_3^-)$, $Br^-$ and $Cl^-$; perhalogenate anion such as $ClO_4^-$; Lewis acid anion such as $AlCl_4^-$, $FeCl_4^-$ and $SnCl_5^-$; inorganic acid anion such as $NO_3^-$ and $SO_4^{2-}$; sulfonate anion such as p-toluenesulfonic acid, naphthalenesulfonic acid and alkyl-substituted naphthalenesulfonic acid having from 1 to 5 carbon atoms (hereinafter simply referred to as "C1-5"); organic sulfonate anion such as $CF_3SO_3^-$ and $CH_3SO_3^-$; and carboxylate anion such as $CH_3COO^-$ and $C_6H_5COO^-$.

Other examples include polymer electrolyte anions such as polyacrylic acid, polymethacrylic acid, polystyrene-sulfonic acid, polyvinylsulfonic acid, polyvinylsulfuric acid, poly-α-methylsulfonic acid, polyethylenesulfonic acid and polyphosphoric acid. However, the present invention is not limited thereto. Among these anions, preferred is a high molecular or low molecular organic sulfonic acid compound or polyphosphoric acid compound. Preferably, an aromatic sulfonic acid compound (e.g., sodium dodecylbenzenesulfonate, sodium naphthalenesulfonate) is used as the anion-donating compound.

Among the organic sulfonate anions, more effective dopants are a sulfoquinone compound having one or more sulfo-anion group ($-SO_3^-$) within the molecule and having a quinone structure, and an anthracene sulfonate anion.

Examples of the fundamental skeleton for the sulfoquinone anion of the above-described sulfoquinone compound include p-benzoquinone, o-benzoquinone, 1,2-naphthoquinone, 1,4-naphthoquinone, 2,6-naphthoquinone, 9,10-anthraquinone, 1,4-anthraquinone, 1,2-anthraquinone, 1,4-chrysenequinone, 5,6-chrysenequinone, 6,12-chrysenequinone, acenaphthoquinone, acenaphthenequinone, camphorquinone, 2,3-bornanedione, 9,10-phenanthrenequinone and 2,7-pyrenequinone.

In the case where the counter electrode is solid, an electrically conducting layer may be provided thereon so as to attain good electrical contact with an exterior leading line (for example, lead frame) which is used, if desired.

The electrically conducting layer can be, formed, for example, by the solidification of an electrically conducting paste, the plating, the metallization or the formation of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more kinds of pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the metal vapor-deposited include aluminum, nickel, copper and silver.

More specifically, for example, carbon paste and silver paste are stacked in this order on the second electrode and these are molded with a material such as epoxy resin, thereby fabricating a capacitor. This capacitor may have a niobium or tantalum lead which is sintered and molded integrally with the niobium monoxide sintered body or welded afterward.

The thus-fabricated capacitor of the present invention is jacketed using, for example, resin mold, resin case, metallic jacket case, dipping of resin or laminate film, and then used as a capacitor product for various uses.

In the case where the counter electrode is liquid, the capacitor fabricated comprising the above-described two electrodes and a dielectric material is housed, for example, in a can electrically connected to the counter electrode to complete the capacitor. In this case, the electrode side of the niobium monoxide sintered body is guided outside through a niobium or tantalum lead described above- and at the same time, insulated from the can using an insulating rubber or the like.

By producing a sintered body for capacitors using the niobium monoxide powder produced according to the embodiment of the present invention described in the foregoing pages and producing a capacitor from the sintered body, a capacitor having a small leakage current and good reliability can be obtained.

The capacitor of the present invention has a larger electrostatic capacitance for the volume than the conventional tantalum capacitors and therefore, a more compact capacitor product can be obtained.

The capacitor of the present invention having such properties can be applied to uses, for example, as a by-pass capacitor or a coupling capacitor which are frequently used in an analogue circuit and a digital circuit, and also to uses of conventional tantalum capacitors. In general, such a capacitor is frequently used in an electronic circuit and when the capacitor of the present invention is used, the limitation in the arrangement of electronic parts or the discharge of heat can be relieved, as a result, an electronic circuit having high reliability can be disposed in a narrower space than that necessary for conventional electronic circuits.

Furthermore, when the capacitor of the present invention is used, an electronic instrument having smaller size and higher reliability than conventional ones can be obtained, such as a computer, computer peripheral equipment (e.g., a PC card), mobile equipment (e.g., a portable telephone), home appliance, equipment mounted on vehicles, artificial satellite and communication equipment.

BEST MODE FOR CARRYING OUT THE INVENTION

The present invention is described in detail below by referring to Examples and Comparative Examples, however, the present invention is not limited to these Examples.

In each Example, the tapping density, the angle of repose, the particle size and the pore diameter of the niobium monoxide powder and the capacitance, leakage current, capacitance appearance ratio, moisture resistance of the capacitor and ESR value of the capacitor were measured by the following methods.

(1) Measurement of Tapping Density

The tapping density was measured in accordance with the Method by Tapping Apparatus and the Measuring Instrument in the Apparent Specific Gravity Measuring Method of Industrial Sodium Carbonate specified in JIS (Japanese Industrial Standard, Edition of 2000) K1201-1.

(2) Measurement of Angle of Repose

The angle of repose was measured using the flowability measuring instrument and the sample amount specified in JIS (Japanese Industrial Standard, Edition of 2000) Z2504. More specifically, niobium monoxide powder was dropped on a horizontal plane from the hopper whose lower end was at a height of 6 cm above the horizontal plane and the angle of the slant face from the apex of the circular cone generated to the horizontal plane was designated as the angle of repose.

(3) Measurement of Particle Size

Using an apparatus manufactured by Microtrack (HRA 9320-X100), the particle size distribution was measured by the laser diffraction scattering method. A particle size value ($D_{50}$; μm) when the accumulated volume % corresponded to 50 volume % was designated as the average particle size.

(4) Measurement of Pore Diameter

Using Poresizer 9320 manufactured by Micromeritics, the pore size distribution was measured by the mercury porosimetry method.

In the present invention, the maximal value was determined from the rate of change in the press-fitted amount and by defining the pore diameter shown by the maximal value as the peak top, the maximal value was used as the size of relative intensity of the peak to which this peak top belongs.

(5) Measurement of Capacitance of Capacitor

The LCR meter manufactured by Hewlett-Packard was connected between terminals of the produced chip at room temperature and the measured capacitance at 120 Hz was defined as the capacitance of the capacitor processed into a chip.

(6) Measurement of Leakage Current of Capacitor

The current value measured after a d.c. voltage of 6.3 V was continuously applied between terminals of the produced chip for 1 minute at room temperature was defined as the leakage current value of the capacitor processed into a chip.

(7) Capacitance Appearance Ratio of Capacitor

Assuming that the capacitance when a sintered body electrochemically formed in an aqueous 0.1% phosphoric acid solution for 1,000 minutes under the conditions of 80° C. and 20 V was measured in 30% sulfuric acid was 100%, the capacitance appearance ratio was expressed by the ratio to the capacitance after a capacitor was produced.

(8) Moisture Resistance Value of Capacitor

The moisture resistance value was expressed by the number of units where the capacitance after the produced capacitor was left standing at 60° C. and 95% RH for 500 hours was less than 110% or less than 120% of the initial value. As the number of units of less than 110% is larger, the moisture resistance value was judged better.

(9) Measurement of ESR Value of Capacitor

The LCR meter manufactured by Hewlett-Packard was connected between terminals of the produced chip at room temperature and the measured ESR value at 100 kHz, 1.5 VDC and 0.5 Vrms was defined as the ESR value of the capacitor.

(10) Content of each Element of Nitrogen, Oxygen, Sulfur and Carbon

Each content was analyzed using an oxygen-nitrogen or carbon-sulfur analyzer. (Both devices are manufactured by LECO.)

(11) Content of Metal Elements

The content was analyzed using an atomic absorptiometer, ICP emission spectrometer or ICP mass spectrometer device. (All the devices are manufactured by SHIMADZU Corporation.)

(12) Composition of Niobium Oxide

When representing a niobium oxide by $NbO_x$, the value of x was determined by calculating the ratio by mol of the oxygen content measured in above (10) to the content of niobium element measured in above (11).

Example 1

A stainless steel cylinder-shape reactor was prepared, having the inside diameter of 150 mm and inside capacity of 5 l, the inside surface of which was lined with a tantalum sheet. The reactor was provided with pipes for supplying and emitting argon gas, a supplier of powder materials, stirrer, temperature adjuster, heater and cooler. The reactor, charged with 400 g shavings of metal magnesium, was flashed with argon and heated to 750° C. (reducing temperature). After keeping the temperature for 15 minutes to melt the metal magnesium, the stirrer was started. About 10 g of $Nb_2O_5$ powder was charged through the supplier of powder materials. The inside temperature of the reactor rose by about 30° C. After the inside temperature of the reactor lowered to the reducing temperature, about 10 g of $Nb_2O_5$ powder was charged again through the supplier of powder materials. The operation was repeated until adding all amount (350 g) of $Nb_2O_5$ powder. After completing the addition of the $Nb_2O_5$ powder, the mixture was kept being stirred for 30 minutes at reducing temperature. Subsequently, the reactor was cooled to 10° C. or lower and argon flashing was stopped. Under reduced pressure, air was gradually added to the reactor not to allow the inside temperature of the reactor to exceed 50° C. The reaction product was taken out and washed with a mixed aqueous solution of hydrogen peroxide and nitric acid and ion-exchanged water by turns. The produced niobium monoxide powder had a composition of $NbO_{0.98}$.

200 g of the niobium monoxide powder was placed in a niobium-made pot, added with water and zirconia balls and pulverized for 10 hours. The obtained niobium monoxide powder had an average particle size of 1.0 μm. To the slurry was added 20 g of butyl polymethylmethacrylate having an average particle size of 1 μm. The contents were mixed for 1 hour using a shaking mixer. After removing zirconia balls, the mixture was placed in a conical drier and vacuum-dried under the conditions of $1\times10^2$ Pa and 80° C.

Subsequently, this niobium monoxide powder was heated under $1\times10^{-2}$ Pa at 250 to 400° C. for 12 hours to decompose and remove butyl polymethylmethacrylate, and then sintered under reduced pressure of $4\times10^{-3}$ Pa at 1,200° C. for 2 hours. The sintered body was cooled until the product temperature was lowered to 30° C. or lower and air was gradually added thereto not to allow the product temperature to exceed 50° C. The obtained niobium monoxide sintered lump was cracked using a roll granulator to obtain a niobium monoxide cracked powder having an average particle size of 100 μm.

The physical properties of this niobium monoxide powder, such as tapping density, average particle size, angle of repose, BET specific surface area and pore diameter peak top are shown in Table 1.

The thus-obtained niobium monoxide powder (about 0.1 g) was charged into the hopper of a tantalum device automatic molding machine (TAP-2R, manufactured by Seiken) and automatically molded together with a 0.3 mmφ niobium wire to manufacture a molded article having a size of approximately 0.3 cm×0.18 cm×0.45 cm. The outer appearance (chip, crack, distortion) and the dispersion in the mass of the molded article are shown in Table 1.

This molded article was left standing in a vacuum of $4\times10^{-3}$ Pa at 1,400° C. for 30 minutes to obtain a sintered body. 100 Units of this sintered body were prepared and each was electrochemically formed using an aqueous 0.1% phosphoric acid solution at a voltage of 20 V for 200 minutes to form an oxide dielectric film on the surface.

Subsequently, an operation of dipping the sintered body in an aqueous 60% manganese nitrate solution and then heating it at 220° C. for 30 minutes was repeated to form a manganese dioxide layer as the counter electrode layer on the oxide dielectric film. On this counter electrode layer, a carbon layer and a silver paste layer were stacked in this order. After mounting a lead frame thereon, the device as a whole was molded with an epoxy resin to manufacture a chip-type capacitor. The capacitance appearance ratio of the capacitor, and the average capacitance and the average leakage current (hereinafter simply referred to as "LC") of the chip-type capacitors (n=100 units) are shown in Table 1.

Example 2

In an SUS 304-made reactor, 1,000 g of a niobium ingot was placed and thereinto, hydrogen was continuously introduced at 400° C. for 10 hours. After cooling, the hydrogenated niobium lump was placed in an SUS 304-made pot containing zirconia balls and pulverized for 10 hours. Thereafter, this hydride was formed into a 20 vol % slurry with water, charged together with zirconia balls into a spike mill and wet-pulverized at 40° C. or lower for 7 hours to obtain a pulverized slurry of niobium hydride. After removing zirconia balls, the slurry was dried under the conditions of $1\times10^2$ Pa and 50° C. Subsequently, the obtained niobium hydride powder was heated under $1\times10^{-2}$ Pa at 400° C. for 4 hours to be dehydrogenated. Furthermore, the dehydrogenated powder was heated at 200° C. for 5 hours with the presence of air to obtain the niobium monoxide powder having an average particle size of 0.9 μm. The produced niobium monoxide powder had a composition of $NbO_{0.88}$.

830 g of the niobium monoxide powder and 400 g of toluene were placed in a niobium-made pot, and 170 g of barium oxide having an average particle size of 1 μm was added. Furthermore, zirconia balls were added and the contents were mixed for 1 hour using a shaking mixer. After removing zirconia balls, the mixture was placed in a niobium-made vat and dried under the conditions of $1\times10^2$ Pa at 50° C.

Subsequently, the dried mixture was sintered under reduced pressure of $4\times10^{-3}$ Pa at 1,200° C. for 3 hours. The resulting barium oxide-mixed niobium monoxide sintered lump was cooled until the product temperature was lowered to 30° C. or lower, and then cracked using a roll granulator to obtain a barium oxide-mixed niobium monoxide cracked powder having an average particle size of 95 μm.

Into a polytetrafluoroethylene container, 500 g of this barium oxide-mixed niobium monoxide cracked powder and 1,000 g of ion-exchanged water were charged and cooled to 15° C. or lower. Separately, an aqueous solution obtained by mixing 600 g of 60% nitric acid, 150 g of 30% hydrogen peroxide and 750 g of ion-exchanged water and cooled to 15° C. or lower was prepared. Then, 1,000 g of this aqueous solution was added dropwise with stirring to an aqueous solution having suspended therein the barium oxide-mixed niobium monoxide cracked powder while taking care not to allow the water temperature to exceed 20° C. After the completion of dropwise addition, the solution was continuously stirred for another 1 hour, left standing for 30 minutes and then decanted. Thereto, 2,000 g of ion-exchanged water was added and the resulting solution was stirred for 30 minutes, left standing for 30 minutes and then decanted. This operation was repeated, 5 times. Thereafter, the niobium monoxide cracked powder was charged into a Teflon-made column and washed with water for 4 hours while flowing ion-exchanged water. At this time, the electrical conductivity of the washing water was 0.9 μS/cm.

After the completion of water washing, the niobium monoxide cracked powder was dried at 50° C. under reduced pressure as a result, about 400 g of niobium monoxide powder was obtained.

The physical properties of this niobium monoxide powder, such as tapping density, average particle size, angle of repose, BET specific surface area and pore diameter peak top, are shown in Table 1.

The thus-obtained niobium monoxide powder (about 0.1 g) was charged into the hopper of a tantalum device automatic molding machine (TAP-2R, manufactured by Seiken) and automatically molded together with a 0.3 mmφ niobium wire to manufacture a molded article having a size of approximately 0.3 cm×0.18 cm×0.45 cm. The outer appearance and the dispersion in the mass of the molded article are shown in Table 1.

This molded article was left standing under reduced pressure of $4\times10^{-3}$ Pa at 1,400° C. for 30 minutes to obtain a sintered body. 100 Units of this sintered body were prepared and each was electrochemically formed using an aqueous 0.1% phosphoric acid solution at a voltage of 20 V for 200 minutes to form an oxide dielectric film on the surface.

Subsequently, an operation of contacting the oxide dielectric film with an equivalent mixed solution of an aqueous 10% ammonium persulfate solution and an aqueous 0.5% anthraquinonesulfonic acid solution and then with pyrrole vapor was repeated at least 5 times to form a counter electrode comprising polypyrrole on the oxide dielectric film.

On this counter electrode, a carbon layer and a silver paste layer were stacked in this order. After mounting a lead frame thereon, the device as a whole was molded with an epoxy resin to manufacture a chip-type capacitor. The capacitance appearance ratio of this capacitor, and the average capacitance and the average LC value of the chip-type capacitors (n=100 units) are shown in Table 1.

Examples 3 to 10

Niobium monoxide powders, molded articles thereof, sintered bodies and capacitors were produced in the same manner as in Example 1 except for changing the average particle size and the amount added of the butyl polymethylmethacrylate, or in the same manner as in Example 2 except for changing the average particle size and the amount added of the barium oxide. The physical properties of niobium monoxide powder and the outer appearance and the dispersion in the mass of molded article, and the capacitance and the LC of capacitor are shown in Table 1.

Examples 11 to 22

Niobium monoxide powders, molded articles and sintered bodies of Examples 11 to 14 and 16 to 18 were produced in the same manner as in Example 1 and niobium monoxide powders, molded articles and sintered bodies of Examples 15 and 19 to 22 were produced in the same manner as in Examples 2, each except for using the activator shown in Table 1 in place of the butyl polymethylmethacrylate or barium oxide. The physical properties of niobium monoxide powder, and the outer appearance and the dispersion in the mass of molded article are shown in Table 1.

These molded articles were then left standing under reduced pressure of $4\times10^{-3}$ Pa at 1,400° C. for 30 minutes to obtain sintered bodies. 100 Units of each sintered body were prepared and electrochemically formed using an aqueous 0.1% phosphoric acid solution at a voltage of 20 V for 200 minutes to form an oxide dielectric film on the surface.

Subsequently, each sintered body having formed thereon a dielectric material was dipped in an aqueous solution containing 25 mass % of ammonium persulfate (Solution 1), pulled up, dried at 80° C. for 30 minutes, dipped in an isopropanol solution containing 18 mass % of 3,4-ethylenedioxythiophene (Solution 2), pulled up and then left standing in an atmosphere of 60° C. for 10 minutes, thereby performing the oxidation polymerization. This sintered body was again dipped in Solution 1 and then treated in the same manner as above. The operation from the dipping in Solution 1 until the oxidation polymerization was repeated 8 times. Then, the sintered body was washed with warm water at 50° C. for 10 minutes and dried at 100° C. for 30 minutes, whereby a counter electrode comprising electrically conducting poly(3, 4-ethylenedioxythiophene) was formed.

On this counter electrode, a carbon layer and a silver paste layer were stacked in this order. After mounting a lead frame thereon, the device as a whole was molded with an epoxy resin to manufacture a chip-type capacitor. The capacitance appearance ratio of this capacitor, and the average capacitance and the average LC value of the chip-type capacitors (n=100 units) are shown in Table 1.

Example 23

A niobium monoxide powder having an average particle size of 0.9 μm was obtained in the same manner as in Example 1. The niobium monoxide powder had a composition of $NbO_{1.02}$. 200 g of the obtained niobium monoxide powder was placed in an aluminum reactor and heated at 300° C. for 2 hours under nitrogen atmosphere. The amount of the nitrogen, contained in the obtained niobium monoxide material powder was 2,100 mass ppm. A niobium monoxide cracked powder having an average particle size of 130 μm containing nitrogen was obtained in the same manner as in Example 2 using barium oxide as an activator, and a molded article and sintered body thereof were produced. The physical properties of the niobium monoxide powder, outer appearance and the dispersion in the mass of the sintered body are shown in Table 1. Subsequently, a chip-type capacitor was manufactured in the same manner as in Example 22. The capacitance appearance ratio of this capacitor, and the average capacitance and the average LC value of the chip-type capacitors (n=100 units) are shown in Table 1.

Example 24

A niobium monoxide powder having an average particle size of 0.9 μm was obtained in the same manner as in Example 1. The niobium monoxide powder had a composition of $NbO_{1.02}$. 200 g of the obtained niobium monoxide powder and 5 g of sulfur powder were, well mixed and placed in a platinum reactor. After the inside of the reactor was purged with argon gas, the reactor was heated at 250° C. for 2 hours. The amount of the nitrogen contained in the obtained niobium monoxide material powder was 2,500 mass ppm. A niobium monoxide cracked powder having an average particle size of 200 μm containing sulfur was obtained in the same manner as in Example 2 using barium oxide as an activator, and a molded article and sintered body thereof were produced. The physical properties of the niobium monoxide powder, outer appearance and the dispersion in the mass of the sintered body are shown in Table 1. Subsequently, a chip-type capacitor was manufactured in the same manner as in Example 22. The capacitance appearance ratio of this capacitor, and the average capacitance and the average LC value of the chip-type capacitors (n=100 units) are shown in Table 1.

Example 25

A niobium monoxide material powder containing boron was obtained in the same manner as in Example 24 using a boron powder. The amount of the boron contained in the obtained niobium monoxide material powder was 1,200 mass ppm. A niobium monoxide cracked powder having an average particle size of 80 μm containing boron was obtained in the same manner as in Example 2 using barium oxide as an activator, and a molded article and sintered body thereof were produced. The physical properties of the niobium monoxide powder, outer appearance and the dispersion in the mass of the sintered body are shown in Table 1. Subsequently, a chip-type capacitor was manufactured in the same manner as in Example 22. The capacitance appearance ratio of this capacitor, and the average capacitance and the average LC value of the chip-type capacitors (n=100 units) are shown in Table 1.

Examples 26 to 29

Niobium monoxide powders were obtained in the same manner as in Example 2 except for using, as the starting material, a niobium-neodymium alloy hydride powder in Example 26, a niobium-antimony alloy hydride powder in Example 27, a niobium-ytterbium-boron alloy hydride powder in Example 28 and a niobium-yttrium-zinc alloy hydride powder in Example 29. Each of the obtained niobium oxide powder had a composition of $NbO_{0.94}$ in Example 26, $NbO_{0.96}$ in Example 27, $NbO_{1.12}$ in Example 28 and $NbO_{1.08}$ in Example 29, containing other elements. Furthermore, using the same activators and method as in Example 2, a niobium monoxide powder having an average particle size of 70 to 250 μm and containing other elements and a sintered body thereof were obtained. The physical properties of each niobium monoxide powder, outer appearance and the dispersion in the mass of the sintered body, are shown in Table 1. Subsequently, a chip-type capacitor was manufactured in the same manner as in Example 2. The capacitance appearance ratio of this capacitor, and the average capacitance and the average LC value of the chip-type capacitors (n=100 units) are shown in Table 1.

Comparative Examples 1 to 3

A stainless steel cylinder-shape reactor was prepared, having the inside diameter of 150 mm and inside capacity of 5 l, the inside surface of which was lined with a tantalum sheet. The reactor was provided with pipes for supplying and emitting argon gas, a supplier of powder materials, stirrer, temperature adjuster, heater and cooler. The reactor, charged with 400 g shavings of metal magnesium, was flashed with argon and heated to 750° C. (reducing temperature). After keeping the temperature for 15 minutes to melt the metal magnesium, the stirrer was started. About 10 g of $Nb_2O_5$ powder (a powder having an average particle size of 2 to 10 μm was used) was charged through the supplier of powder materials. The inside temperature of the reactor rose by about 30° C. After the inside temperature of the reactor lowered to the reducing temperature, about 10 g of $Nb_2O_5$ powder was charged again through the supplier of powder materials. The operation was repeated until adding all amount (350 g) of $Nb_2O_5$ powder. After completing the addition of; the $Nb_2O_5$ powder, the mixture was kept being stirred for 30 minutes at reducing temperature. Subsequently, the reactor was cooled too 10° C. or lower and argon flashing was stopped. Under reduced pressure, air was gradually added to the reactor not to allow the inside temperature of the reactor to exceed 50° C. The reaction product was washed with a mixed aqueous solution of hydrogen peroxide and nitric acid and ion-exchanged water by turns. The produced niobium monoxide powder had a composition of $NbO_{1.01}$ and an average particle size of 1.3 to 7 μm.

The physical properties of this niobium monoxide powder, such as tapping density, average particle size, angle of repose, BET specific surface area and average pore diameter, are shown in Table 1.

The thus-obtained niobium monoxide powder (about 0.1 g) was charged into the hopper of a tantalum device automatic molding machine (TAP-2R, manufactured by Seiken) and automatically molded together with a 0.3 mmφ niobium wire to manufacture a molded article, however, an article was not able to be molded.

Comparative Examples 4 to 9

Niobium powders having a tapping density of 0.2 to 0.4 g/ml or 2.6 to 3.3 g/ml were obtained in the same manner as in Example 2 except for changing the amount added of the barium oxide having an average particle size of 1 μm. The physical properties thereof are shown in Table 1.

Each of the thus-obtained niobium monoxide powders (about 0.1 g) was charged into the hopper of a tantalum device automatic molding machine (TAP-2R, manufactured by Seiken) and automatically molded together with a 0.3 mmφ niobium wire to manufacture molded articles having a size of approximately 0.3 cm×0.18 cm×0.45 cm. The outer appearance and the dispersion in the mass of these molded articles are shown in Table 1.

These molded articles were left standing in a vacuum of $4×10^{-3}$ Pa at 1,400° C. for 30 minutes to obtain sintered bodies. 100 Units of each sintered body were prepared and electrochemically formed using an aqueous 0.1% phosphoric acid solution at a voltage of 20 V for 200 minutes to form an oxide dielectric film on the surface.

Subsequently, an operation of contacting the oxide dielectric film with an equivalent mixed solution of an aqueous 10% ammonium persulfate solution and an aqueous 0.5% anthraquinonesulfonic acid solution and then with pyrrole vapor was repeated at least 5 times, whereby a counter electrode comprising polypyrrole was formed on the oxide dielectric film.

On this counter electrode, a carbon layer and a silver paste layer were stacked in this order. After mounting a lead frame thereon, the device as a whole was molded with an epoxy resin to manufacture a chip-type capacitor. The capacitance appearance ratio of the capacitor and the average capacitance and the average LC value of the chip-type capacitors (n=100 units) are shown in Table 1.

Example 30

A niobium monoxide powder was obtained in the same manner as in Example 2. The niobium monoxide powder had a composition $NbO_{0.95}$ and an average particle size of 0.6 μm. Thereto, anhydrous acetone was added so to make a concentration of the slurry 60% by mass and well suspended. This slurry was charged in a niobium-made pot, and thereto, barium oxide having an average particle size of 1.4 μm and 23 μm were added in an amount of 15% by mass and 10% by mass of the niobium monoxide respectively. Furthermore, zirconia balls were added and the contents were mixed for 1 hour using a shaking mixer. After removing zirconia balls, the mixture was placed in a niobium-made vat and vacuum-dried under the conditions of $1×10^2$ Pa and 50° C.

The barium oxide-mixed niobium monoxide sintered lump and a niobium monoxide cracked powder were obtained in the same manner as in Example 2.

500 g of this barium oxide-mixed niobium monoxide cracked powder was added to 1,000 g of ion-exchanged water cooled to 15° C. or lower with stirring while taking care not to allow the water temperature to exceed 20° C. After the completion of addition, the slurry was continuously stirred for another 1 hour, left standing for 30 minutes and then decanted. Thereto, 2,000 g of ion-exchanged water was added and the resulting slurry was stirred for 30 minutes, left standing for 30 minutes and then decanted. This operation was repeated 5 times. Thereafter, the niobium monoxide cracked powder was charged into a Teflon-made column and washed with water for 4 hours while flowing ion-exchanged water. At this time, the electrical conductivity of the washing water was 0.5 μS/cm.

After the completion of water washing, the niobium monoxide cracked powder was dried at 50° C. under reduced pressure, as a result, about 350 g of niobium monoxide powder was obtained.

The physical properties of this niobium monoxide powder, such as tapping density, average particle size, angle of repose, BET specific surface area and average pore diameter, are shown in Table 1.

A sintered body was manufactured in the same manner as in Example 2. The outer appearance and the dispersion in the mass of the sintered body are shown in Table 1.

Next a dielectric film was formed on the surface of a sintered body of the molded article in the same manner as in Example 2. Then a counter electrode was formed and a carbon layer and a silver paste layer were stacked thereon in this order. After mounting a lead frame thereon, the device as a whole was molded with an epoxy resin to manufacture a chip-type capacitor. The capacitance appearance ratio of this capacitor, and the average capacitance and the average LC value of the chip-type capacitors (n=100 units) are shown in Table 1.

Examples 31 to 37

Activator-mixed niobium monoxide cracked powders were obtained in the same manner as in Example 30 except for changing the kinds, the average particle size and the addition amount of the two activators to be mixed. In the same manner as in Example 30, the activator was dissolved in a solution selected among water, a solution including acid, alkali, ion-exchanged resin, a solution of ammonium sulfate and a solution containing ethylenediamine tetracetic acid to obtain a niobium monoxide powder. The physical properties of the niobium monoxide powders are shown in Table 1.

Furthermore, a molded article was produced to manufacture a chip-type capacitor in the same manner as in Example 30. The outer appearance and the dispersion in the mass of molded article, and the average capacitance and the LC of the capacitors are shown in Table 1.

Examples 38 to 40

Niobium monoxide powders containing other elements were obtained in the same manner as in Example 30 except for using, as the starting material, a niobium-tin alloy hydride powder in Example 38, a niobium tungsten alloy powder in Example 39 and a niobium-tantalum alloy powder in Example 40. The physical properties of the niobium monoxide powders are shown in Table 1.

Furthermore, a molded article was produced to manufacture a chip-type capacitor in the same manner as in Example 30. The outer appearance and the dispersion in the mass of molded article, and the average capacitance and the LC of the capacitors are shown in Table 1.

Examples 41 to 51

Niobium monoxide sintered bodies were produced in the same manner as in Example 2 using the niobium monoxide powder obtained in Examples 30 to 40. The distribution of pore diameter for each of the sintered bodies is shown in Table 2.

Examples 52 to 62

100 Units of respective sintered bodies produced in the same manner as in Examples 41 to 51 each was electrochemically formed in an aqueous 0.1% phosphoric acid solution at 80° C. and 20 V for 1,000 minutes to form an oxide dielectric film on the surface of the sintered body. These sintered bodies after the electrochemical forming were impregnated with polypyrrole cathode agent (hereinafter referred to as "a cathode agent by method A") by repeating the operation of adhesion of ammonium persulfate and antraquinone sulfonic acid thereon and vapor-phased polymerization by pyrrole vapor. Thereon a carbon layer and a silver paste layer were stacked in this order and the whole was sealed with an epoxy resin to manufacture a chip-type capacitor. The capacitance appearance ratio and ESR of the capacitor are shown in Table 3.

Examples 63 to 68

Primary particles of niobium monoxide having an average particle size of 0.8 μm were obtained in the same manner as in Example 2. The obtained primary particles were sintered and pulverized to obtain a niobium monoxide granulated powder. Then, 0.1 g of this granulated powder was charged in a metal mold (4.0 mm×3.5 mm×1.8 mm) together with a separately prepared niobium wire having a length of 10 mm and a thickness of 0.3 mm and a load was applied thereto as shown in Table 4 using a tantalum device automatic molding machine (TAP-2R, manufactured by Seiken) to produce molded articles. The molded articles each was then sintered at 1,400° C. for 30 minutes to obtain an objective sintered body. By controlling the load applied by the molding machine, sintered bodies having a pore diameter distribution shown in Table 4 were produced. The size, the specific surface area and the CV value of the sintered body of Example 63 were 24.7 mm$^3$, 1.1 m$^2$/g and 86,000 μFV/g, respectively. In other Examples, each value was within ±2% of Example 63.

Examples 69 to 71

Sintered bodies were obtained in the same manner as in Examples 63 to 65 except for changing the average particle size of the primary particles to 0.5 μm by classifying the primary particles. The size, the specific surface area and the CV value of the sintered body of Example 69 were 24.9 mm$^3$, 1.5 m$^2$/g and 126,000 μFV/g, respectively. In other Examples, each value was within ±1% of Example 69. The pore diameter distribution of each sintered body produced is shown in Table 4.

Example 72

A sintered body was obtained in the same manner as in Example 68 except for using a niobium monoxide powder obtained in the same manner as in Example 4 in place of the granulated powder. The size, the specific surface area and the CV value of the sintered body of Example 72 were 24.8 mm$^3$, 1.2 m$^2$/g and 79,000 μFV/g, respectively. The pore diameter distribution of the sintered body produced is shown in Table 4.

Comparative Examples 10 to 12

Sintered bodies were produced in the same manner as in Examples 63 to 65 except that a niobium monoxide powder obtained by heat-treating at 1,200° C. a niobium monoxide powder prepared by reducing niobium pentoxide with magnesium was, used in place of the niobium monoxide granulated powder used in Examples 63 to 65. The size, the specific surface area and the CV value of the sintered body of Comparative Example 10 were 24.3 mm³, 0.8 m²/g and 85,000 µFV/g, respectively. In other Examples, each value was within ±2% of Comparative Example 10. The pore diameter distribution of each sintered body produced is shown in Table 4.

Example 73

60 Units of respective sintered bodies produced in the same manner as in Example 30 and Examples 63 to 72 each was electrochemically formed in an aqueous 0.1% phosphoric acid solution at 80° C. and 20 V for 1,000 minutes to form an oxide dielectric film on the surface of the sintered body. These sintered bodies after the electrochemical forming were divided into groups each consisting of 30 units. 30 Units of the sintered body in each group were impregnated with polypyrrole cathode agents by method A described in Examples 52 to 62 or a cathode agent comprising the mixture of zinc dioxide and zinc sulfate (hereinafter referred to as "a cathode agent by method B", having 98% by mass of zinc dioxide) by repeatedly dipped into a mixture solution of zinc acetate and ammonium persulfate. Thereon, carbon paste and silver paste were stacked in this order and the device was molded with an epoxy resin to manufacture a chip-type capacitor. The capacitance appearance ratio and the moisture resistance value of each capacitor manufactured are shown in Table 5.

Comparative Example 13

60 Units of respective sintered bodies produced in the same manner as in Comparative Examples 9 to 12 each was electrochemically formed in an aqueous 0.1% phosphoric acid solution at 80° C. and 20 V for 1,000 minutes to form an oxide dielectric film on the surface of the sintered body. These sintered bodies after the electrochemical forming were divided into groups each consisting of 30 units. 30 Units of the sintered body in each group were impregnated with a polypyrrole cathode agent by method A shown in Example 52 to 62. Thereon, carbon paste and silver paste were stacked in this order and the device was molded with an epoxy resin to manufacture a chip-type capacitor. The capacitance appearance ratio and the moisture resistance value of each capacitor manufactured are shown in Table 5.

Comparative Examples 14 to 17

100 units of respective niobium monoxide sintered bodies produced in the same manner as in Comparative Examples 9 to 12 each were electrochemically formed in an aqueous 0.1% phosphoric acid solution at 80° C. and 20 V for 1,000 minutes to form an oxide dielectric film on the surface of the sintered body. These sintered bodies after the electrochemical forming were impregnated with a polypyrrole cathode agent by method A described in Examples 52 to 62. Thereon, carbon paste and silver paste were stacked in this order and the device was sealed with an epoxy resin to manufacture a chip-type capacitor. The capacitance appearance ratio and ESR of each capacitor manufactured are shown in Table 3.

TABLE 1-1

| | Activator | | | | | | Physical Properties of Niobium Powder | |
|---|---|---|---|---|---|---|---|---|
| | Kind | Amount Added (mass %) | Average Particle Size (µm) | Tapping Density (g/ml) | Average Particle Size (µm) | Angle of Repose (°) | BET Specific Surface Area (m²/g) | Pore Diameter Peak Top (µm) |
| Example 1 | Butyl polymethylmethacrylate | 10 | 1.0 | 0.7 | 100 | 42 | 1.5 | 1.2 |
| Example 2 | BaO | 17 | 1.0 | 1.1 | 95 | 45 | 1.7 | 1.1 |
| Example 3 | Butyl polymethylmethacrylate | 5 | 1.0 | 1.2 | 110 | 40 | 1.5 | 1.0 |
| Example 4 | Butyl polymethylmethacrylate | 1 | 1.0 | 1.9 | 130 | 38 | 1.3 | 0.8 |
| Example 5 | BaO | 35 | 1.0 | 0.5 | 85 | 50 | 1.9 | 0.9 |
| Example 6 | BaO | 23 | 1.0 | 0.8 | 95 | 47 | 1.8 | 1.0 |
| Example 7 | BaO | 20 | 3.0 | 1.1 | 125 | 45 | 1.7 | 2.9 |
| Example 8 | BaO | 25 | 5.0 | 1.2 | 140 | 43 | 1.5 | 5.3 |
| Example 9 | BaO | 30 | 9.0 | 1.5 | 95 | 40 | 1.3 | 8.5 |
| Example 10 | BaO | 40 | 21.0 | 1.7 | 105 | 37 | 1.0 | 22 |
| Example 11 | camphor | 40 | 100 | 1.8 | 180 | 32 | 1.3 | 95 |
| Example 12 | butyl polyacrylate | 18 | 25 | 1.5 | 250 | 30 | 1.5 | 24 |
| Example 13 | polyvinyl alcohol | 15 | 8.0 | 1.2 | 80 | 49 | 1.4 | 8.1 |
| Example 14 | ZnO | 15 | 3.0 | 1.1 | 75 | 47 | 1.8 | 2.9 |
| Example 15 | $Re_2O_7$ | 20 | 6.0 | 1.1 | 140 | 41 | 1.9 | 5.6 |
| Example 16 | $WO_2$ | 7 | 2.0 | 1.4 | 100 | 46 | 1.7 | 2.1 |
| Example 17 | $SnO_2$ | 10 | 0.8 | 1.2 | 90 | 47 | 1.7 | 0.8 |
| Example 18 | MgO | 20 | 3.0 | 1.1 | 85 | 46 | 1.9 | 2.9 |
| Example 19 | $Mn(NO_3)_2$ | 10 | 2.0 | 1.5 | 100 | 44 | 1.6 | 2.3 |
| Example 20 | $CaCO_3$ | 15 | 1.0 | 1.0 | 90 | 44 | 1.8 | 1.0 |
| Example 21 | $Y_2O_3$ | 5 | 5.0 | 1.0 | 130 | 44 | 1.7 | 5.5 |
| | $B_2O_3$ | 15 | 7.5 | | | | | 7.8 |
| | | 15 | 1.0 | | | | | 1.2 |
| Example 22 | BaO | 17 | 1.0 | 1.2 | 70 | 48 | 1.5 | 1.2 |
| Example 23 | BaO | 17 | 1.0 | 1.1 | 130 | 45 | 1.7 | 1.1 |
| Example 24 | BaO | 15 | 1.5 | 1.2 | 200 | 39 | 1.8 | 1.6 |
| Example 25 | BaO | 12 | 0.7 | 1.1 | 80 | 47 | 1.8 | 0.8 |
| Example 26 | BaO | 25 | 3.5 | 0.9 | 250 | 39 | 1.7 | 3.4 |
| Example 27 | BaO | 20 | 2.5 | 1.0 | 90 | 47 | 1.8 | 2.5 |
| Example 28 | BaO | 15 | 1.5 | 1.1 | 70 | 47 | 1.7 | 1.3 |
| Example 29 | BaO | 10 | 0.7 | 1.2 | 150 | 41 | 1.8 | 0.7 |
| Example 30 | BaO | 15 | 1.4 | 0.9 | 100 | 48 | 1.8 | 1.5 |
| | | 10 | 23 | | | | | 25 |

TABLE 1-2

| Example | Additive | | | | | | | | |
|---|---|---|---|---|---|---|---|---|---|
| Example 31 | MgO | 17 | 1.5 | 1.0 | 130 | 44 | 1.8 | 1.6 | |
| | | 15 | 30 | | | | | 33 | |
| Example 32 | CaCO₃ | 20 | 2.5 | 1.1 | 160 | 44 | 1.7 | 2.7 | |
| | | 10 | 17 | | | | | 18 | |
| Example 33 | MgO | 18 | 1.5 | 1.0 | 115 | 45 | 1.8 | 1.6 | |
| | B₂O₃ | 8 | 10 | | | | | 12 | |
| Example 34 | Al₂O₃ | 20 | 2.0 | 0.9 | 150 | 48 | 1.9 | 2.2 | |
| | | 20 | 25 | | | | | 23 | |
| Example 35 | MgO | 15 | 1.0 | 0.9 | 130 | 46 | 1.9 | 1.1 | |
| | Al₂O₃ | 15 | 20 | | | | | 22 | |
| Example 36 | Y₂O₃ | 16 | 2.0 | 1.0 | 95 | 46 | 1.7 | 1.9 | |
| | Al₂O₃ | 9 | 25 | | | | | 26 | |
| Example 37 | MgO | 15 | 1.5 | 0.9 | 135 | 45 | 2.0 | 1.6 | |
| | | 20 | 25 | | | | | 24 | |
| Example 38 | CaCO₃ | 15 | 1.3 | 0.9 | 85 | 47 | 1.9 | 1.3 | |
| | BaO | 10 | 23 | | | | | 22 | |
| Example 39 | BaO | 15 | 1.7 | 0.9 | 110 | 48 | 1.9 | 1.5 | |
| | | 10 | 26 | | | | | 24 | |
| Example 40 | BaO | 15 | 1.7 | 0.9 | 130 | 45 | 1.9 | 1.7 | |
| | MgO | 10 | 30 | | | | | 29 | |
| Comp. Ex. 1 | — | — | — | 2.6 | 1.3 | 77 | 3.2 | 0.7 | |
| Comp. Ex. 2 | — | — | — | 2.9 | 2.6 | 73 | 1.8 | 1.9 | |
| Comp. Ex. 3 | — | — | — | 3.0 | 7 | 70 | 0.7 | 3.9 | |
| Comp. Ex. 4 | BaO | 42 | 1.0 | 0.4 | 95 | 50 | 1.8 | 0.8 | |
| Comp. Ex. 5 | BaO | 45 | 1.0 | 0.3 | 80 | 58 | 1.9 | 0.8 | |
| Comp. Ex. 6 | BaO | 55 | 1.0 | 0.2 | 55 | 58 | 2.2 | 0.9 | |
| Comp. Ex. 7 | BaO | 0.8 | 1.0 | 2.6 | 90 | 49 | 1.2 | 0.7 | |
| Comp. Ex. 8 | BaO | 0.6 | 1.0 | 3.1 | 90 | 49 | 1.0 | 0.6 | |
| Comp. Ex. 9 | BaO | 0.4 | 1.0 | 3.3 | 105 | 45 | 0.9 | 0.6 | |

TABLE 1-3

| | Sintered Body | | | Electrical Properties | |
|---|---|---|---|---|---|
| | Outer Appearance: chip, crack, distortion | Dispersion in Mass (g/sintered body) | Impregnation ratio of cathode agent (%) | Capacitance (μF) | LC (μA) |
| Example 1 | none | 0.1 ± 0.002 | 91 | 429 | 14 |
| Example 2 | none | 0.1 ± 0.002 | 90 | 483 | 21 |
| Example 3 | none | 0.1 ± 0.002 | 91 | 427 | 19 |
| Example 4 | none | 0.1 ± 0.002 | 88 | 401 | 17 |
| Example 5 | none | 0.1 ± 0.002 | 89 | 482 | 21 |
| Example 6 | none | 0.1 ± 0.002 | 91 | 483 | 24 |
| Example 7 | none | 0.1 ± 0.002 | 88 | 564 | 26 |
| Example 8 | none | 0.1 ± 0.002 | 90 | 532 | 20 |
| Example 9 | none | 0.1 ± 0.002 | 92 | 439 | 15 |
| Example 10 | none | 0.1 ± 0.002 | 91 | 284 | 7 |
| Example 11 | none | 0.1 ± 0.002 | 89 | 411 | 21 |
| Example 12 | none | 0.1 ± 0.002 | 91 | 401 | 14 |
| Example 13 | none | 0.1 ± 0.002 | 92 | 539 | 25 |
| Example 14 | none | 0.1 ± 0.002 | 88 | 517 | 22 |
| Example 15 | none | 0.1 ± 0.002 | 92 | 512 | 16 |
| Example 16 | none | 0.1 ± 0.002 | 87 | 511 | 17 |
| Example 17 | none | 0.1 ± 0.002 | 92 | 418 | 13 |
| Example 18 | none | 0.1 ± 0.002 | 95 | 609 | 23 |
| Example 19 | none | 0.1 ± 0.002 | 90 | 392 | 16 |
| Example 20 | none | 0.1 ± 0.002 | 94 | 599 | 30 |
| Example 21 | none | 0.1 ± 0.002 | 94 | 447 | 22 |
| Example 22 | none | 0.1 ± 0.002 | 91 | 454 | 15 |
| Example 23 | none | 0.1 ± 0.002 | 92 | 555 | 17 |
| Example 24 | none | 0.1 ± 0.002 | 90 | 501 | 14 |
| Example 25 | none | 0.1 ± 0.002 | 91 | 533 | 14 |
| Example 26 | none | 0.1 ± 0.002 | 89 | 552 | 19 |
| Example 27 | none | 0.1 ± 0.002 | 91 | 561 | 19 |
| Example 28 | none | 0.1 ± 0.002 | 90 | 549 | 17 |
| Example 29 | none | 0.1 ± 0.002 | 89 | 538 | 16 |
| Example 30 | none | 0.1 ± 0.002 | 98 | 595 | 22 |

TABLE 1-4

| | Outer Appearance | Dispersion in Mass | Impregnation ratio | Capacitance | LC |
|---|---|---|---|---|---|
| Example 31 | none | 0.1 ± 0.002 | 96 | 577 | 22 |
| Example 32 | none | 0.1 ± 0.002 | 96 | 572 | 24 |
| Example 33 | none | 0.1 ± 0.002 | 94 | 551 | 19 |
| Example 34 | none | 0.1 ± 0.002 | 98 | 587 | 24 |
| Example 35 | none | 0.1 ± 0.002 | 98 | 586 | 20 |
| Example 36 | none | 0.1 ± 0.002 | 98 | 584 | 22 |
| Example 37 | none | 0.1 ± 0.002 | 98 | 591 | 20 |
| Example 38 | none | 0.1 ± 0.002 | 98 | 589 | 18 |
| Example 39 | none | 0.1 ± 0.002 | 98 | 585 | 19 |
| Example 40 | none | 0.1 ± 0.002 | 98 | 596 | 24 |
| Comp. Ex. 1 | could not be molded | — | — | — | — |
| Comp. Ex. 2 | could not be molded | — | — | — | — |
| Comp. Ex. 3 | could not be molded | — | — | — | — |
| Comp. Ex. 4 | present | 0.1 ± 0.016 | 90 | 379 | 18 |
| Comp. Ex. 5 | present | 0.1 ± 0.028 | 92 | 402 | 18 |
| Comp. Ex. 6 | present | 0.1 ± 0.048 | 94 | 428 | 17 |
| Comp. Ex. 7 | none | 0.1 ± 0.002 | 40 | 140 | 9 |
| Comp. Ex. 8 | none | 0.1 ± 0.002 | 33 | 112 | 7 |
| Comp. Ex. 9 | none | 0.1 ± 0.002 | 21 | 60 | 5 |

TABLE 2

| Examples | Method to obtain a niobium powder | Pore Distribution | | |
|---|---|---|---|---|
| | | Pore Diameter of Peak 1, μm | Pore Diameter of Peak 2, μm | Peak having Larger Relative Intensity |
| Example 41 | Example 30 | 0.64 | 3.0 | Peak 2 |
| Example 42 | Example 31 | 0.65 | 3.0 | Peak 2 |
| Example 43 | Example 32 | 0.70 | 2.4 | Peak 2 |
| Example 44 | Example 33 | 0.69 | 2.1 | Peak 2 |
| Example 45 | Example 34 | 0.68 | 2.9 | Peak 2 |
| Example 46 | Example 35 | 0.67 | 2.6 | Peak 2 |
| Example 47 | Example 36 | 0.64 | 2.9 | Peak 2 |
| Example 48 | Example 37 | 0.67 | 2.9 | Peak 2 |
| Example 49 | Example 38 | 0.63 | 2.8 | Peak 2 |
| Example 50 | Example 39 | 0.64 | 2.9 | Peak 2 |
| Example 51 | Example 40 | 0.67 | 3.0 | Peak 2 |

TABLE 3

| Examples and Comparative Examples | Method to obtain a sintered body | Capacitance appearance Ratio, % | Capacitance | ESR Ω |
|---|---|---|---|---|
| Example 52 | Example 41 | 98 | 595 | 0.023 |
| Example 53 | Example 42 | 96 | 577 | 0.025 |
| Example 54 | Example 43 | 96 | 572 | 0.024 |
| Example 55 | Example 44 | 94 | 551 | 0.025 |
| Example 56 | Example 45 | 98 | 587 | 0.023 |
| Example 57 | Example 46 | 98 | 586 | 0.023 |
| Example 58 | Example 47 | 98 | 584 | 0.022 |
| Example 59 | Example 48 | 98 | 591 | 0.022 |
| Example 60 | Example 49 | 98 | 589 | 0.021 |
| Example 61 | Example 50 | 98 | 585 | 0.023 |
| Example 62 | Example 51 | 98 | 596 | 0.022 |
| Comparative Example 14 | Comparative Example 9 | 21 | 60 | 0.166 |
| Comparative Example 15 | Comparative Example 10 | 72 | 307 | 0.083 |
| Comparative Example 16 | Comparative Example 11 | 74 | 315 | 0.083 |
| Comparative Example 17 | Comparative Example 12 | 69 | 292 | 0.091 |

TABLE 4

| Examples and Comparative Examples | Molding Load Applied, N | Pore Distribution | | |
|---|---|---|---|---|
| | | Pore Diameter of Peak 1, μm | Pore Diameter of Peak 2, μm | Peak having Larger Relative Intensity |
| Example 63 | 451 | 0.64 | 1.02 | Peak 2 |
| Example 64 | 789 | 0.43 | 1.31 | Peak 2 |
| Example 65 | 1130 | 0.29 | 0.78 | Peak 2 |
| Example 66 | 564 | 0.35 | 2.35 | Peak 2 |
| Example 67 | 901 | 0.49 | 0.96 | Peak 2 |
| Example 68 | 337 | 0.52 | 2.89 | Peak 2 |
| Example 69 | 451 | 0.61 | 2.18 | Peak 2 |
| Example 70 | 789 | 0.45 | 2.88 | Peak 2 |
| Example 71 | 1130 | 0.35 | 1.12 | Peak 2 |
| Example 72 | 337 | 0.63 | 2.78 | Peak 2 |
| Comparative Example 10 | 451 | 0.67 | none | — |
| Comparative Example 11 | 789 | 0.42 | none | — |
| Comparative Example 12 | 1130 | 0.25 | none | — |

TABLE 5

| Examples and Comparative Examples | Manufacturing Method of Sintered Body | Method of Impregnating Cathode Agent | Capacitance Appearance Ratio, % | Moisture Resistance Value | |
|---|---|---|---|---|---|
| | | | | Number of units having capacitance of 100% to less than 110% | Number of units having capacitance of 110% to less than 120% |
| Example 73 | Example 30 | A | 98 | 30/30 | 0/30 |
| | Example 63 | A | 83 | 30/30 | 0/30 |
| | | B | 88 | 30/30 | 0/30 |
| | Example 64 | A | 83 | 30/30 | 0/30 |
| | | B | 86 | 30/30 | 0/30 |
| | Example 65 | A | 79 | 27/30 | 3/30 |
| | Example 66 | A | 83 | 30/30 | 0/30 |
| | Example 67 | A | 81 | 30/30 | 0/30 |
| | Example 68 | A | 80 | 30/30 | 0/30 |
| | Example 69 | A | 86 | 30/30 | 0/30 |
| | Example 70 | A | 82 | 30/30 | 0/30 |
| | Example 71 | A | 79 | 28/30 | 2/30 |
| | Example 72 | A | 96 | 30/30 | 0/30 |
| Comparative Example 13 | Comparative Example 9 | A | 21 | 4/30 | 26/30 |
| | Comparative Example 10 | A | 72 | 14/30 | 16/30 |
| | Comparative Example 11 | A | 74 | 17/30 | 13/30 |
| | Comparative Example 12 | A | 69 | 12/30 | 18/30 |

INDUSTRIAL APPLICABILITY

A niobium monoxide powders of the present invention represented by formula: $NbO_x$ ($x=0.8$ to $1.2$) and having a tapping density of 0.5 to 2.5 g/ml, an average particle size of 10 to 1000 μm, angle of repose from 10 to 60° and the BET specific surface area from 0.5 to 40 $m^2/g$ is excellent in flowability and capable of continuous molding. By using a niobium sintered body, which is obtained by sintering the niobium powder and has a pore diameter peak top in a range of 0.01 μm to 500 μm, preferably having a plurality of pore diameter peak tops in the pore distribution, for the capacitor electrode, a high capacitance appearance ratio can be obtained and a capacitor can be produced with low equivalent series resistance (ESR) and excellent properties of leakage current and moisture resistance.

The invention claimed is:

1. A sintered body which has a pore distribution having a plurality of pore diameter peak tops produced by sintering a niobium monoxide powder represented by formula: $NbO_x$ ($x=0.8$ to $1.2$) having a tapping density of 0.5 to 2.5 g/ml.

2. The sintered body as claimed in claim 1, which has a pore distribution having a pore diameter peak top in the range of 0.01 μm to 500 μm.

3. A niobium monoxide sintered body for a capacitor electrode, wherein the pore distribution of the niobium monoxide sintered body has a plurality of pore diameter peak tops.

4. The niobium monoxide sintered body as claimed in claim 1, wherein the pore distribution has two pore diameter peak tops.

5. The niobium monoxide sintered body as claimed in claim 3, wherein among the plurality of pore diameter peak tops, the peak tops of the two peaks having a highest relative intensity are present in the range of 0.2 to 0.7 μm and in the range of 0.7 to 3 μm respectively.

6. The niobium monoxide sintered body as claimed in claim 3, wherein among the plurality of pore diameter peak tops, the peak top of the peak having a highest relative intensity is present in the larger diameter side than the peak top of the peak having a next highest relative intensity.

7. The niobium monoxide sintered body as claimed in claim 1, wherein the sintered body has a volume of 10 mm$^3$ or more including the volume of pore void.

8. The niobium monoxide sintered body as claimed in claim 1, wherein the sintered body has a specific surface area of 0.2 to 7 m$^2$/g.

9. The niobium monoxide sintered body as claimed in claim 1, wherein a part of the sintered body is nitrided.

10. The niobium sintered body as claimed in claim 1, wherein the sintered body is a sintered body obtained from a niobium monoxide molded article which gives a sintered body having a CV value of 40,000 to 200,000 μFV/g when sintered at 1,400° C.

11. A method for producing a niobium monoxide sintered body wherein the sintered body has a pore distribution having a plurality of pore diameter peak tops, comprising:

press-molding a niobium monoxide powder represented by formula: NbO$_x$ (x=0.8 to 1.2) having a tapping density of 0.5 to 2.5 g/ml into a predetermined shape; and then heating at a temperature of from 500° C. to 2,000° C. for 1 minute to 10 hours under a pressure of 10$^{-5}$ to 10$^2$ Pa.

* * * * *